(12) United States Patent
Zeamer et al.

(10) Patent No.: US 12,473,039 B2
(45) Date of Patent: Nov. 18, 2025

(54) VEHICLE CAB SYSTEMS AND METHODS

(71) Applicant: Oshkosh Corporation, Oshkosh, WI (US)

(72) Inventors: Jon Zeamer, Oshkosh, WI (US); Greg Steffens, Oshkosh, WI (US); Jon Branson, Oshkosh, WI (US); Jeremy Andringa, Oshkosh, WI (US); Ryan Wolf, Oshkosh, WI (US); Sam Mueller, Oshkosh, WI (US); Amanda Miller, Oshkosh, WI (US); Jeff Verhagen, Oshkosh, WI (US); Travis Zuleger, Oshkosh, WI (US); Josh Gentner, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/987,098

(22) Filed: Nov. 15, 2022

(65) Prior Publication Data
US 2023/0150584 A1 May 18, 2023

Related U.S. Application Data

(60) Provisional application No. 63/280,360, filed on Nov. 17, 2021.

(51) Int. Cl.
*B62D 33/06* (2006.01)
(52) U.S. Cl.
CPC .................................. *B62D 33/06* (2013.01)
(58) Field of Classification Search
CPC ...... B62D 33/06; B62D 33/077; B62D 21/09; B62D 33/0612; B60G 2204/162
See application file for complete search history.

(56) References Cited

U.S. PATENT DOCUMENTS

| 2,172,831 | A | * | 9/1939 | Carlson | B62D 33/04 |
| | | | | | 296/182.1 |
| 2,959,239 | A | * | 11/1960 | Kenlock | B62D 33/06 |
| | | | | | 296/190.08 |

(Continued)

FOREIGN PATENT DOCUMENTS

| CN | 203651947 U | * | 6/2014 | |
| CN | 114954695 A | * | 8/2022 | ............. B62D 33/06 |

(Continued)

OTHER PUBLICATIONS

Bai, A Half-hanging Road Coach, Jun. 18, 2014, EPO, CN 203651947 U, Machine Translation of Description (Year: 2014).*

(Continued)

*Primary Examiner* — Paul N Dickson
*Assistant Examiner* — Matthew D Lee
(74) *Attorney, Agent, or Firm* — FOLEY & LARDNER LLP

(57) ABSTRACT

A vehicle includes a chassis coupled to a wheel and having a first portion and a second portion, and a cab supported by the first portion of the chassis. The cab includes a tunnel configured to receive at least partially receive the first portion of the chassis and a seat supported within an interior of the cab and having a seat support and a backrest. An uppermost surface of the tunnel is arranged at a tunnel height that is lower than a support height of the seat support. The vehicle further includes a body supported by the second portion of the chassis. The first portion of the chassis includes a frame extension or an inward-offset frame rail configuration and the second portion of the chassis comprises a first frame rail and a second frame rail.

20 Claims, 16 Drawing Sheets

(56) References Cited

U.S. PATENT DOCUMENTS

| | | | |
|---|---|---|---|
| 3,055,699 A * | 9/1962 | May | B62D 33/06 296/190.08 |
| 5,632,353 A | 5/1997 | Kimberley | |
| 5,636,899 A | 6/1997 | Schiff et al. | |
| 5,676,483 A | 10/1997 | Koubek | |
| 5,908,221 A | 6/1999 | Neil | |
| 5,931,536 A | 8/1999 | Wu | |
| 5,952,730 A | 9/1999 | Haller et al. | |
| 6,460,932 B1 | 10/2002 | Kopish et al. | |
| 7,246,859 B2 | 7/2007 | Igarashi et al. | |
| 7,490,910 B1 | 2/2009 | Draughon | |
| 7,832,805 B1 | 11/2010 | Lai | |
| 8,480,172 B2 | 7/2013 | Baker et al. | |
| 8,943,946 B1 * | 2/2015 | Richmond | B62D 21/15 89/36.02 |
| 12,090,847 B2 | 9/2024 | Ahn et al. | |
| 2005/0280286 A1 | 12/2005 | Kelley et al. | |
| 2006/0000656 A1 | 1/2006 | Bisick et al. | |
| 2006/0136110 A1 | 6/2006 | Casey et al. | |
| 2006/0290190 A1 | 12/2006 | Zuccato | |
| 2009/0230749 A1 | 9/2009 | Kostak et al. | |
| 2011/0236130 A1 | 9/2011 | Klein et al. | |
| 2012/0098215 A1 | 4/2012 | Rositch et al. | |
| 2012/0112492 A1 * | 5/2012 | Grumbo | B62D 21/02 29/428 |
| 2013/0119738 A1 | 5/2013 | Wallis | |
| 2013/0170932 A1 | 7/2013 | Neufeldt | |
| 2013/0249183 A1 | 9/2013 | Ellifson et al. | |
| 2013/0300073 A1 | 11/2013 | Venton-Walters et al. | |
| 2014/0028542 A1 | 1/2014 | Lovitt et al. | |
| 2014/0183922 A1 | 7/2014 | Cvek | |
| 2014/0265203 A1 | 9/2014 | Zuleger et al. | |
| 2014/0326555 A1 | 11/2014 | Ellifson et al. | |
| 2014/0334956 A1 | 11/2014 | Venton-Walters et al. | |
| 2015/0151651 A1 | 6/2015 | Stingle et al. | |
| 2015/0165941 A1 | 6/2015 | Park | |
| 2015/0191069 A1 | 7/2015 | Zuleger et al. | |
| 2015/0352987 A1 | 12/2015 | Randleman et al. | |
| 2016/0167475 A1 | 6/2016 | Ellifson et al. | |
| 2016/0375805 A1 * | 12/2016 | Krueger | B60N 2/7005 297/216.1 |
| 2017/0267052 A1 | 9/2017 | Zuleger et al. | |
| 2018/0056746 A1 | 3/2018 | Ellifson et al. | |
| 2019/0185077 A1 | 6/2019 | Smith et al. | |
| 2019/0276102 A1 | 9/2019 | Zuleger et al. | |
| 2019/0316322 A1 | 10/2019 | Haller | |
| 2019/0337350 A1 | 11/2019 | Ellifson et al. | |
| 2020/0062071 A1 | 2/2020 | Zuleger et al. | |
| 2020/0247486 A1 | 8/2020 | Groteleuschen et al. | |
| 2020/0256649 A1 | 8/2020 | Krueger et al. | |
| 2020/0290236 A1 | 9/2020 | Bjornstad et al. | |
| 2020/0290237 A1 | 9/2020 | Steffens et al. | |
| 2020/0290238 A1 | 9/2020 | Andringa et al. | |
| 2020/0291846 A1 | 9/2020 | Steffens et al. | |
| 2020/0391569 A1 | 12/2020 | Zuleger | |
| 2021/0171137 A1 | 6/2021 | Zuleger et al. | |
| 2021/0276643 A1 | 9/2021 | Ellifson et al. | |
| 2021/0284019 A1 | 9/2021 | Koshiol et al. | |
| 2021/0300143 A1 | 9/2021 | Zuleger | |
| 2021/0300396 A1 | 9/2021 | Mcgill | |
| 2021/0318713 A1 | 10/2021 | Case et al. | |
| 2021/0354329 A1 | 11/2021 | Hou et al. | |
| 2021/0380179 A1 | 12/2021 | Smith et al. | |
| 2021/0394578 A1 | 12/2021 | Ellifson et al. | |
| 2022/0072736 A1 | 3/2022 | Steffens et al. | |
| 2022/0118854 A1 | 4/2022 | Davis et al. | |
| 2022/0134372 A1 | 5/2022 | Andringa | |
| 2022/0134856 A1 | 5/2022 | Andringa et al. | |
| 2022/0258965 A1 | 8/2022 | Kappers et al. | |
| 2022/0260344 A1 | 8/2022 | Krueger et al. | |
| 2022/0289290 A1 | 9/2022 | Andringa et al. | |
| 2022/0339987 A1 | 10/2022 | Zuleger et al. | |
| 2023/0191887 A1 | 6/2023 | Rausch et al. | |
| 2023/0202301 A1 | 6/2023 | Rocholl et al. | |
| 2023/0287652 A1 | 9/2023 | Shiiguchi et al. | |
| 2023/0373571 A1 * | 11/2023 | Price | B62D 33/00 |
| 2024/0376692 A1 | 11/2024 | Masuda et al. | |

FOREIGN PATENT DOCUMENTS

| | | | | |
|---|---|---|---|---|
| DE | 10007664 A1 * | 8/2001 | | B62D 21/10 |
| FR | 2873335 A1 * | 1/2006 | | B62D 21/18 |
| WO | WO-2006071160 A1 * | 7/2006 | | B62D 33/06 |
| WO | WO-2007101616 A1 * | 9/2007 | | B62D 33/06 |

OTHER PUBLICATIONS

Frentzel, Floor Construction for Driver's Cab of Heavy Duty Vehicles Has Longitudinal Floor Struts of Bent Square Tubes With All Bending Axis in Single Plane, Aug. 30, 2001, EPO, DE 10007664 A1, Machine Translation of Description (Year: 2001).*

Hentsch, Driver's Cab, Sep. 13, 2007, EPO, WO 2007101616 A1, Machine Translation of Description (Year: 2007).* https://info.macktrucks.com/refuse-revolution; "Welcome to the refuse revolution. Mack LR Electric." Retrieved on Mar. 21, 2023.

https://www.youtube.com/watch?v=NQFtAnm7D-c; "All-New Mack LR Electric Garbage Truck." Retrieved on Mar. 21, 2023.

* cited by examiner

VEHICLE CAB SYSTEMS AND METHODS

CROSS-REFERENCE TO RELATED PATENT APPLICATIONS

This application claims the benefit of and priority to U.S. Provisional Application No. 63/280,360, filed Nov. 17, 2021, the entire disclosure of which is hereby incorporated by reference herein.

BACKGROUND

Vocational vehicles typically include a cab that may be coupled to components, such as a chassis or an implement.

SUMMARY OF THE INVENTION

At least one embodiment relates to a vehicle that includes a chassis coupled to a wheel and having a first portion and a second portion, and a cab supported by the first portion of the chassis. The cab includes a tunnel configured to receive at least partially receive the first portion of the chassis and a seat supported within an interior of the cab and having a seat support and a backrest. An uppermost surface of the tunnel is arranged at a tunnel height that is lower than a support height of the seat support. The vehicle further includes a body supported by the second portion of the chassis. The first portion of the chassis includes a frame extension or an inward-offset frame rail configuration and the second portion of the chassis comprises a first frame rail and a second frame rail.

Another embodiment relates to a vehicle that includes a chassis coupled to a wheel and having a first frame rail and a second frame rail, and a cab supported by a front portion of the chassis. The cab includes a tunnel protruding into an interior of the cab. The tunnel divides the cab into a first side and a second side, and the tunnel defines a lateral tunnel width that is greater than a width defined laterally between exteriors of the first frame rail and the second frame rail at the front portion of the chassis. The cab further includes a first seat within the interior of the cab and arranged on the first side of the cab, and a second seat within the interior of the cab and arranged on the second side of the cab. The vehicle further includes a body supported by a rear portion of the chassis.

Another embodiment relates to a vehicle that includes a chassis coupled to a wheel and having a front portion and a rear portion, and a cab supported by the front portion of the chassis. The cab includes a tunnel configured to receive at least part of the front portion of the chassis. The tunnel divides the cab into a first side and a second side. The cab further includes a first seat within the interior of the cab and arranged on the first side of the cab, and a multi-step entry arranged on the first side of the cab and including a first step and a second step. A height of the first step and a height of the second step are approximately equal. The vehicle further includes a body supported by the rear portion of the chassis.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vocational vehicle (e.g., refuse trucks, mixing vehicles) includes a cab configured to house an operator and various systems and controls of the vocational vehicle. In some embodiments, the cab includes a tunnel that extends along a centerline of the cab. The tunnel protrudes into the interior of the cab and defines a recess on the exterior of the cab to receive a support structure. In some embodiments, the support structure is a chassis. The chassis may include a front portion that is narrower than a rear portion, such that the front portion fits within the tunnel of the cab and supports the cab via the tunnel. In some embodiments, there are no other devices (e.g., an engine) disposed within the tunnel. This allows the tunnel to be lower and allows the cab to sit closer to the ground.

In some embodiments, the size of the tunnel is defined by the elevation and width of the chassis. A tunnel with a smaller width allows a seat inside the cab to be positioned further inboard within the cab. A shorter tunnel allows a top of the tunnel to be below where an arm of an operator would traditionally be. In such an embodiment, the seat can be disposed directly next to or even partially above the tunnel and still provide the operator with the necessary clearances. This allows the entire cab to be reduced in size (e.g., total volume) since the seats are disposed closer to the middle of the cab and the tunnel does not restrict operator clearances.

In another embodiment, the cab includes a multi-step entry. The multi-step entry may include a plurality of steps. In one embodiment, the multi-step entry includes stair-style steps, where each of the plurality of steps is substantially the same height. In an exemplary embodiment, a first step is 15 inches above a ground on which the vehicle travels and a second step is 15 inches above the first step. This allows for easier entry and exit for an operator of the vehicle.

Incorporating the elements of the cab described herein allows the overall size of the cab to decrease and improves the ergonomics of the vocational vehicle for an operator. The cab described herein provides easier accessibility with lower floor heights, equal stair heights, a narrower seating configuration to accommodate a smaller cab, a shorter tunnel to allow seats to be positioned more inward in the cab while still maintaining appropriate clearances for an operator, and increased visibility with better positioning of the seats and windows of the cab, among others.

Figure 1:
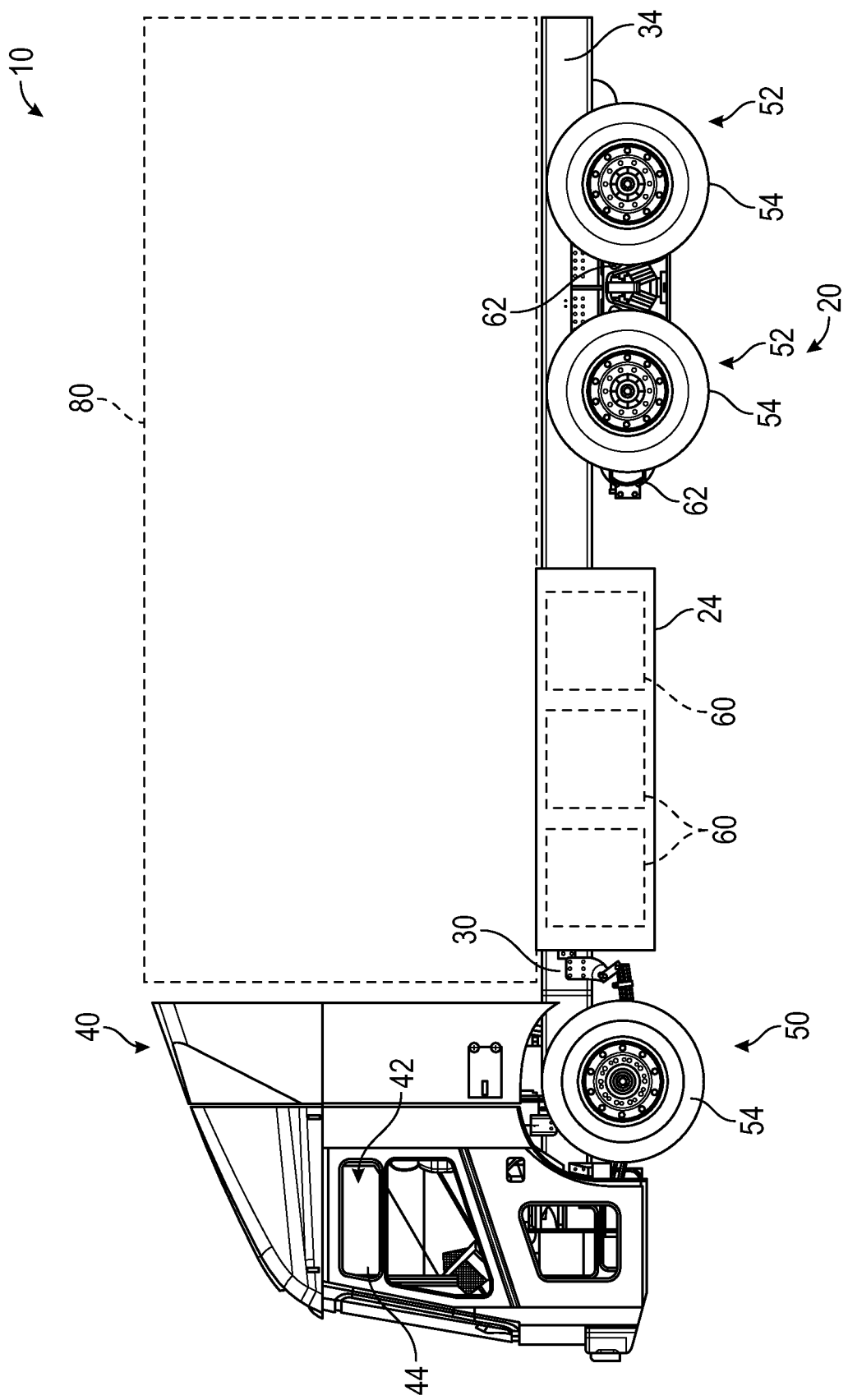
FIG. 1 is a left side view of a vehicle, according to an exemplary embodiment.
Figure 2:
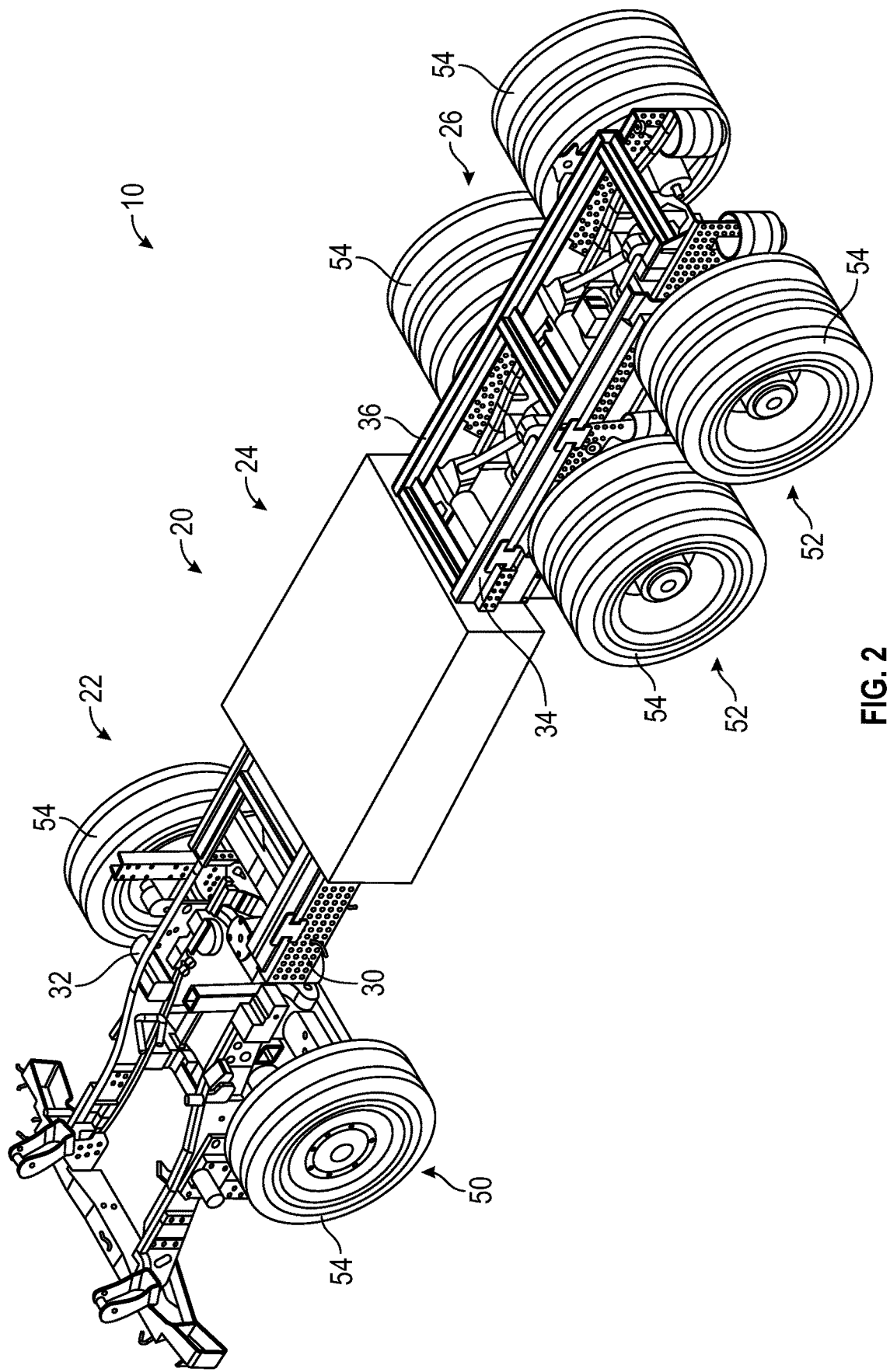
FIG. 2 is a perspective view of a chassis of the vehicle of FIG. 1, according to an exemplary embodiment.

According to an exemplary embodiment, as shown in FIGS. 1 and 2, a vehicle (e.g., a vehicle assembly, a truck, a vehicle base, etc.), shown as vehicle 10, includes a frame assembly or chassis assembly, shown as chassis 20. The chassis assembly may support other components of the vehicle 10. In some embodiments, the chassis 20 extends longitudinally along a length of the vehicle 10. The chassis 20 may extend substantially parallel to a primary direction of travel of the vehicle 10. According to an exemplary embodiment, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing provides frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. In some embodiments, the middle section 24 contains or includes one or more electrical energy storage devices (e.g., batteries, capacitors, etc.). In another embodiment, the middle section 24 includes fuel tanks. In yet another embodiment, the middle section 24 defines a void space or storage volume that can be filled by a user.

According to an exemplary embodiment, a cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42 that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. In one embodiment, the cab interior 42 contains components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

According to an exemplary embodiment, the vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. In some embodiments, the vehicle 10 includes at least one auxiliary axle that may be raised or lowered to accommodate variations in weight being carried by the vehicle 10. In one embodiment, the vehicle 10 includes a pusher axle disposed in front of a drive axle. In another embodiment, the vehicle 10 includes a tag axle disposed behind the drive axle. The auxiliary axle may be coupled with the chassis 20 or to an external frame of the vehicle. The vehicle 10 may include any combination of auxiliary axles. The front axle 50 and the rear axles 52 each include a plurality of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The auxiliary axle may include a plurality of tractive elements. In some embodiments, a wheel and tire assembly 54 of an auxiliary axle is smaller than a wheel and tire assembly 54 of a front axle 50 or a rear axle 52. The auxiliary axle may be configured such that the wheel and tire assembly 54 engages a support surface only when the auxiliary axle is lowered. The front axle 50 and the rear axles 52 may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. As shown in FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10. As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system includes a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide the axle front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 is further be configured to support non-hybrid powertrains. For example, the powertrain system may include a primary driver that is a compression-ignition internal combustion engine that utilizes diesel fuel.

As shown in FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-8 illustrate various examples of how the vehicle 10 may be configured for specific applications. Although only a certain set of vehicle configurations is shown, it should be understood that the vehicle 10 may be configured for use in other applications that are not shown.

According to an exemplary embodiment, the application kit 80 includes various actuators to facilitate certain functions of the vehicle 10. In one embodiment, the application kit 80 includes hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. In another embodiment, the application kit 80 includes hydraulic or pneumatic components that form a hydraulic or pneumatic circuit (e.g., conduits, valves, pumps, compressors, gauges, reservoirs, accumulators, etc.). By way of another embodiment, the application kit 80 includes electrical components (e.g., batteries, capacitors, voltage regulators, motor controllers, etc.). The actuators may be powered by components of the vehicle 10. In some embodiments, the actuators are powered by the batteries 60, the drive motors 62, or the primary driver (e.g., through a power take off).

Figure 3:
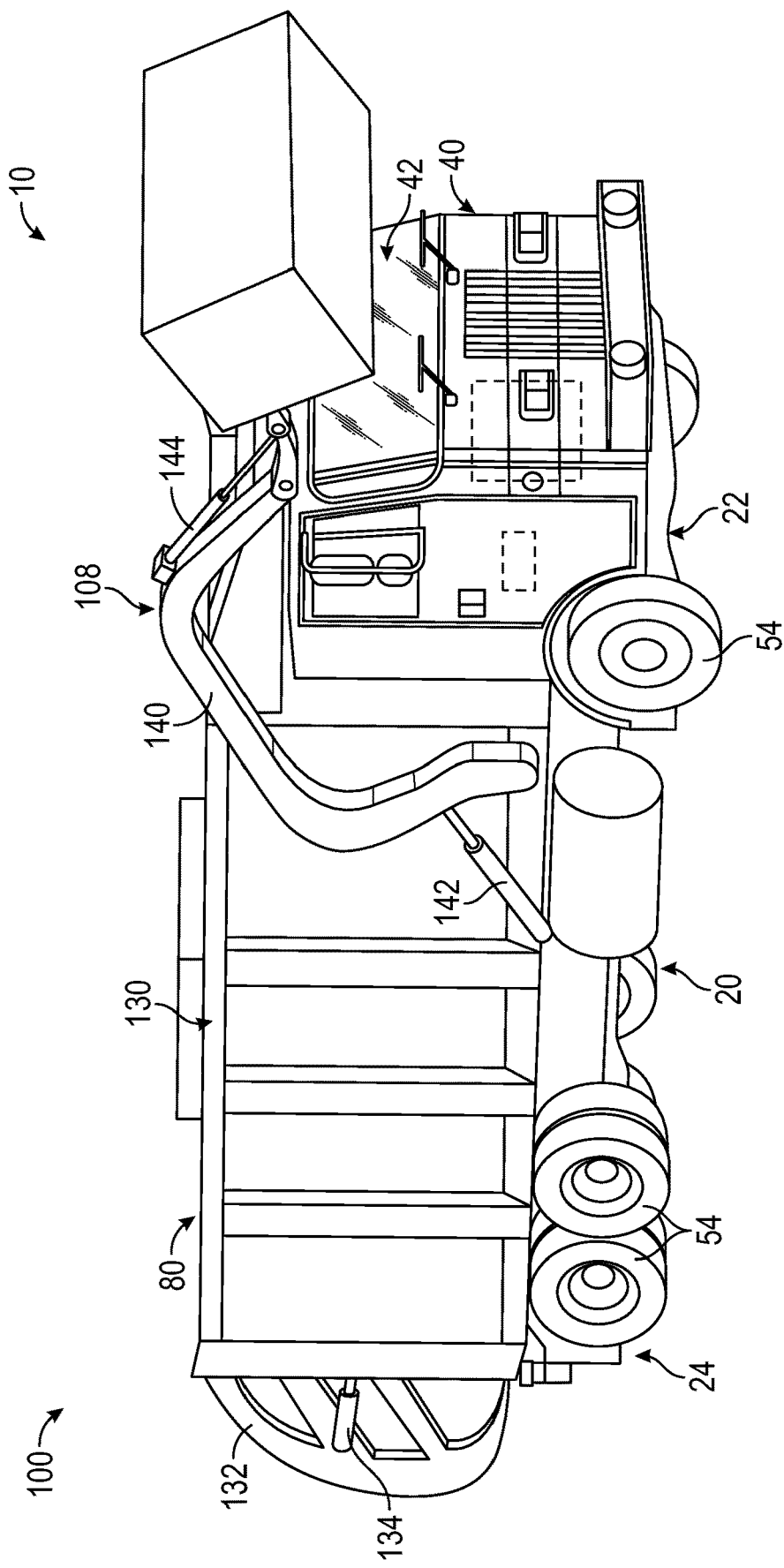
FIG. 3 is a perspective view of the vehicle of FIG. 1 configured as a refuse vehicle, according to an exemplary embodiment.

As shown in FIG. 3, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a side-loading refuse vehicle.

As shown in FIG. 3, the application kit 80 of the refuse vehicle 100 includes a rear body or container, shown as refuse compartment 130, and a pivotable rear portion, shown as tailgate 132. The refuse compartment 130 may facilitate transporting refuse from various waste receptacles within a municipality to a storage and/or a processing facility (e.g., a landfill, an incineration facility, a recycling facility, etc.). According to an exemplary embodiment, loose refuse is placed into the refuse compartment 130 to be compacted. The refuse compartment 130 may also provide temporary storage for refuse during transport to a waste disposal site and/or a recycling facility. In some embodiments, the refuse compartment 130 includes a hopper volume and storage volume. In this regard, refuse may be initially loaded into the hopper volume and later compacted into the storage volume. According to an exemplary embodiment, the hopper volume is positioned between the storage volume and the cab 40 (e.g., refuse is loaded into a position of the refuse compartment 130 behind the cab 40 and stored in a position further toward the rear of the refuse compartment 130). In other embodiments, the storage volume is positioned between the hopper volume and the cab 40 (e.g., in a rear-loading refuse truck, etc.). The tailgate 132 may be pivotally coupled to the refuse compartment 130, and may be movable between a closed position and an open position by an actuator (e.g., a hydraulic cylinder, an electric linear actuator, etc.), shown as tailgate actuator 134 (e.g., to facilitate emptying the storage volume).

As shown in FIG. 3, the refuse vehicle 100 also includes an implement, shown as lift assembly 108 (e.g., a front-loading lift assembly, etc.). According to an exemplary embodiment, the lift assembly 108 includes a pair of lift arms 140, lift arm actuators 142, and articulation actuators 144. The lift arms 140 may be rotatably coupled to the chassis 20. In another embodiment, the lift arms 140 are rotatably coupled to the refuse compartment 130 on each side of the refuse vehicle 100 (e.g., through a pivot, a lug, a shaft, etc.). Such an embodiment provides that the lift assembly 108 extends forward relative to the cab 40 (e.g., a front-loading refuse truck, etc.). In other embodiments, the lift assembly 108 extends rearward relative to the application kit 80 (e.g., a rear-loading refuse truck). In yet other embodiments, the lift assembly 108 extends from a side of the application kit 80 (e.g., a side-loading refuse truck). As shown in FIG. 3, the lift arm actuators 142 are positioned such that extension and retraction of the lift arm actuators 142 rotates the lift arms 140 about an axis extending through the pivot. In this regard, the lift arms 140 may be rotated by the lift arm actuators 142 to lift a refuse container over the cab 40. In an exemplary embodiment, the articulation actuators 144 are positioned to articulate the distal end of the lift arms 140 (e.g., a portion of the lift arms 140 that may be coupled to the refuse container) in order to assist in tipping refuse out of the refuse container and into the refuse compartment 130. The lift arm actuators 142 may then rotate the lift arms 140 to return the empty refuse container to the ground.

Figure 4:
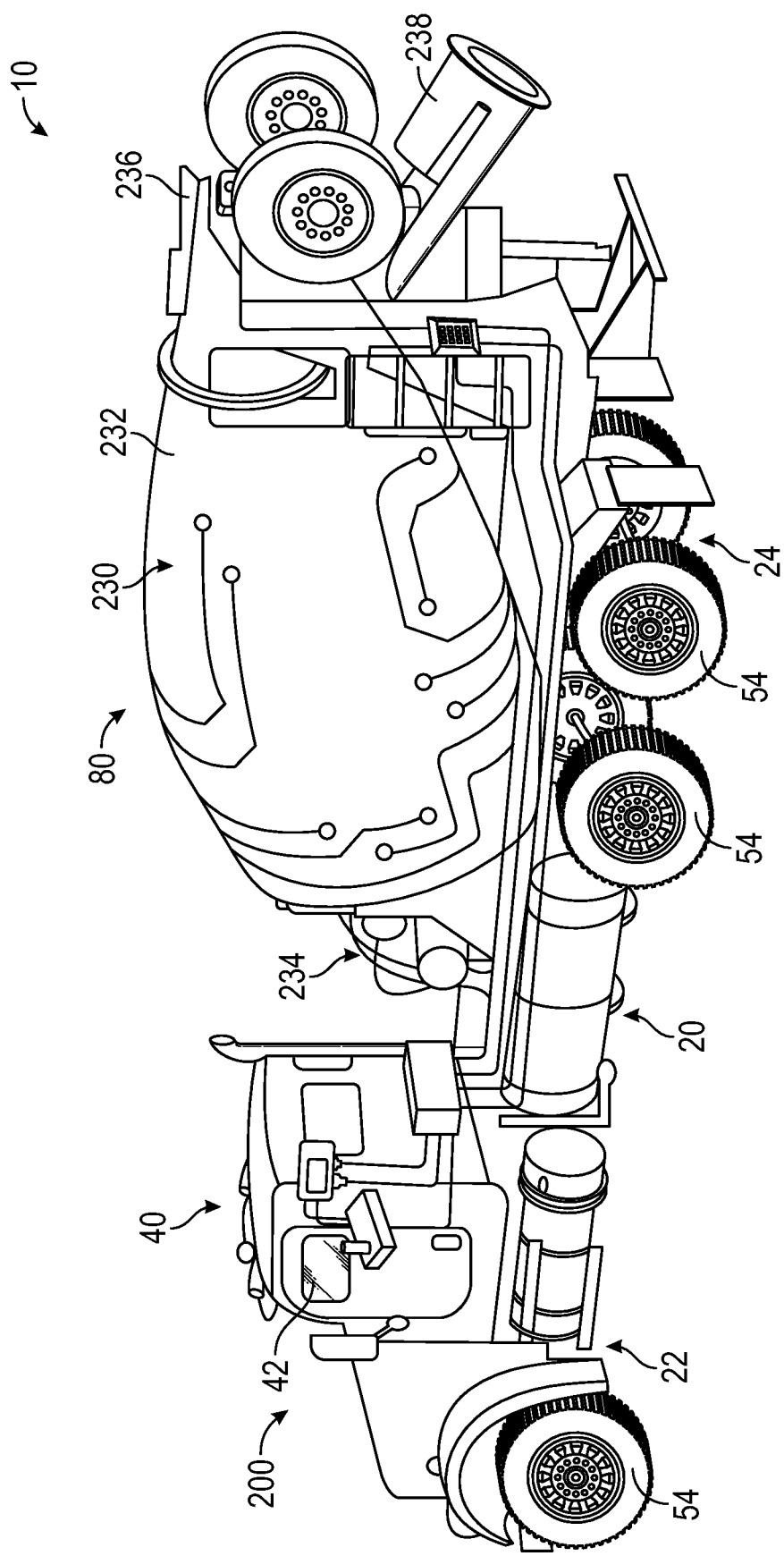
FIG. 4 is a perspective view of the vehicle of FIG. 1 configured as a mixer vehicle, according to an exemplary embodiment.

According to another exemplary embodiment, as shown in FIG. 4, the vehicle 10 is configured as a mixer truck (e.g., a concrete mixer truck, a mixer vehicle, etc.), shown as mixer truck 200. Specifically, the mixer truck 200 is a rear-discharge concrete mixer truck. In other embodiments, the mixer truck 200 is a front-discharge concrete mixer truck.

As shown in FIG. 4, the application kit 80 includes a mixing drum assembly (e.g., a concrete mixing drum), shown as drum assembly 230. The drum assembly 230 includes a mixing drum 232, a drum drive system 234 (e.g., a rotational actuator or motor), an inlet, shown as hopper 236, and an outlet, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 is elevated from the chassis 20 (e.g., from a horizontal plan extending along the chassis 20) at an angle in the range of five degrees to twenty degrees. In other embodiments, the central, longitudinal axis is elevated by less than five degrees (e.g., four degrees, etc.). In yet another embodiment, the mixer truck 200 includes an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves). The injection system may include an injection valve that selectively fluidly couples a supply of fluid to the inner volume of the mixing drum 232. In one embodiment, the injection system is used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) are positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 includes an actuator positioned such that the chute 238 may be selectively pivotable to position the chute 238 (e.g., vertically, laterally, etc.), for example, at an angle at which the mixture is expelled from the mixing drum 232.

Figure 5:
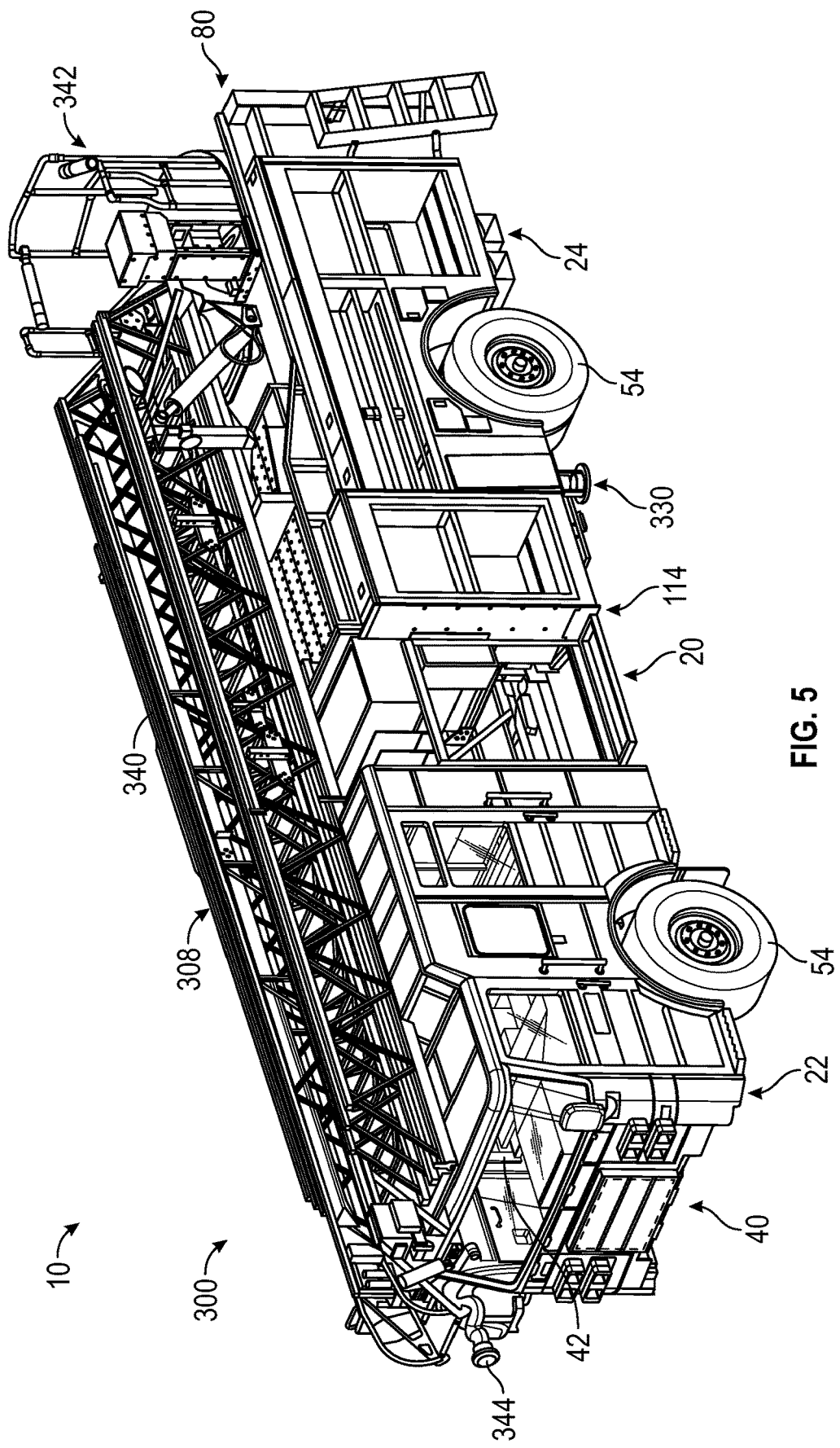
FIG. 5 is a perspective view of the vehicle of FIG. 1 configured as a fire fighting vehicle, according to an exemplary embodiment.

As shown in FIG. 5, the vehicle 10 is configured as a fire fighting vehicle or fire apparatus (e.g., a turntable ladder truck, a pumper truck, a quint, etc.), shown as fire fighting vehicle 300. As shown in FIG. 5, the fire fighting vehicle 300 is configured as a rear-mount aerial ladder truck. In other embodiments, the fire fighting vehicle 300 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. According to an exemplary embodiment, the vehicle 10 is be configured as a police vehicle, an ambulance, a tow truck, or still other vehicles used for responding to a scene (e.g., an accident, a fire, an incident, etc.).

As shown in FIG. 5, in the fire fighting vehicle 300, the application kit 80 is positioned mainly rearward from the cab 40. The application kit 80 includes deployable stabilizers (e.g., outriggers, downriggers, etc.), shown as outriggers 330, that are coupled to the chassis 20. The outriggers 330 may be configured to selectively extend from each lateral side and/or the rear of the fire fighting vehicle 300 and engage a support surface (e.g., the ground) in order to provide increased stability while the fire fighting vehicle 300 is stationary. This increased stability is desirable when the ladder assembly 308 is in use (e.g., extended from the fire fighting vehicle 300) to prevent tipping. In some embodiments, the application kit 80 further includes various storage compartments (e.g., cabinets, lockers, etc.) that are selectively opened and/or accessed for storage and/or component inspection, maintenance, and/or replacement.

As shown in FIG. 5, the application kit 80 includes a ladder assembly 308 coupled to the chassis 20. The ladder assembly 308 includes a series of ladder sections 340 that are slidably coupled with one another such that the ladder sections 340 may extend and/or retract (e.g., telescope)

relative to one another to selectively vary a length of the ladder assembly 308. A base platform, shown as turntable 342, is rotatably coupled to the chassis 20 and to a proximal end of a base ladder section 340 (i.e., the most proximal of the ladder sections 340). The turntable 342 may be configured to rotate about a vertical axis relative to the chassis 20 to rotate the ladder sections 340 about the vertical axis (e.g., up to 360 degrees, etc.). The ladder sections 340 may rotate relative to the turntable 342 about a substantially horizontal axis to selectively raise and lower the ladder sections 340 relative to the chassis 20. As shown, a water turret or implement, shown as monitor 344, is coupled to a distal end of a fly ladder section 340 (i.e., the most distal of the ladder sections 340). The monitor 344 may be configured to expel water and/or a fire suppressing agent (e.g., foam, etc.) from a water storage tank and/or an agent tank onboard the fire fighting vehicle 300, and/or from an external source (e.g., a fire hydrant, a separate water/pumper truck, etc.). In some embodiments, the ladder assembly 308 further includes an aerial platform coupled to the distal end of the fly ladder section 340 and configured to support one or more operators.

Figure 6:
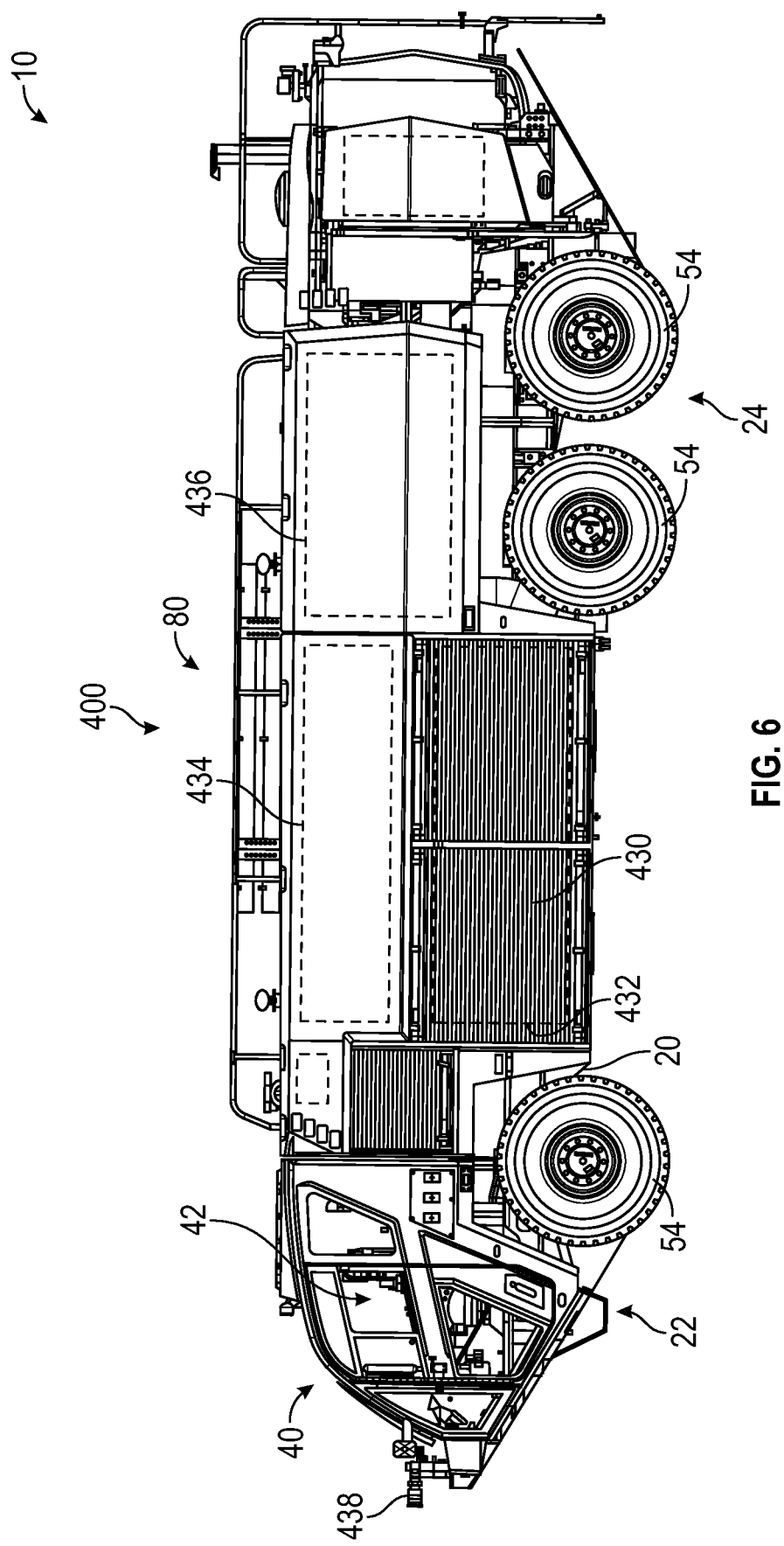
FIG. 6 is a left side view of the vehicle of FIG. 1 configured as an airport fire fighting vehicle, according to an exemplary embodiment.

According to another exemplary embodiment, as shown in FIG. 6, the vehicle 10 is configured as a fire fighting vehicle, shown as airport rescue and fire fighting (ARFF) truck 400. As shown in FIG. 6, the application kit 80 is positioned primarily rearward of the cab 40. As shown, the application kit 80 includes a series of storage compartments or cabinets, shown as compartments 430, that are coupled to the chassis 20. The compartments 430 may store various equipment or components of the ARFF truck 400.

The application kit 80, as shown in FIG. 6, includes a pump system 432 (e.g., an ultra-high-pressure pump system, etc.) positioned within one of the compartments 430 near the center of the ARFF truck 400. The application kit 80 further includes a water tank 434, an agent tank 436, and an implement or water turret, shown as monitor 438. The pump system 432 may include a high pressure pump and/or a low pressure pump, which may be fluidly coupled to the water tank 434 and/or the agent tank 436. The pump system 432 may to pump water and/or fire suppressing agent from the water tank 434 and the agent tank 436, respectively, to the monitor 438. The monitor 438 may be selectively reoriented by an operator to adjust a direction of a stream of water and/or agent. As shown in FIG. 6, the monitor 438 is coupled to a front end of the cab 40.

Figure 7:
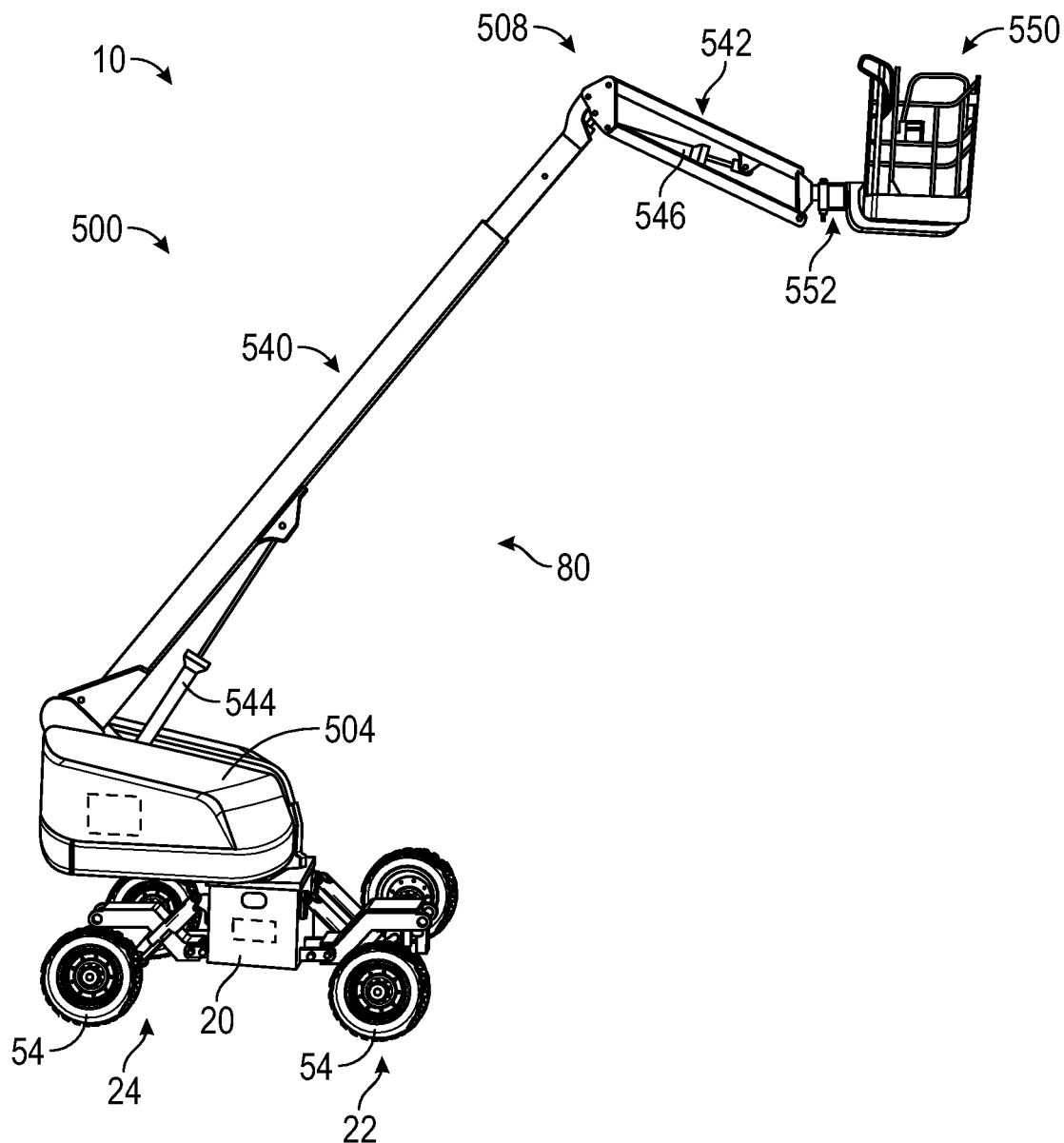
FIG. 7 is a perspective view of the vehicle of FIG. 1 configured as a boom lift, according to an exemplary embodiment.

As shown in FIG. 7, the vehicle 10 is configured as a lift device, shown as boom lift 500. The boom lift 500 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 7, the application kit 80 includes a base assembly, shown as turntable 504 that is rotatably coupled to the chassis 20. The turntable 504 may be configured to selectively rotate relative to the chassis 20 about a substantially vertical axis. In some embodiments, the turntable 504 includes a counterweight positioned near the rear of the turntable 504. The turntable 504 is rotatably coupled to a lift assembly, shown as boom assembly 508. The boom assembly 508 includes a first section or telescoping boom section, shown as lower boom 540. The lower boom 540 includes a series of nested boom sections that extend and retract (e.g., telescope) relative to one another to vary a length of the boom assembly 508. The boom assembly 508 further includes a second boom section or four bar linkage, shown as upper boom 542. The upper boom 542 may include structural members that rotate relative to one another to raise and lower a distal end of the boom assembly 508. In other embodiments, the boom assembly 508 includes more or fewer boom sections (e.g., one, three, five, etc.) and/or a different arrangement of boom sections.

As shown in FIG. 7, the boom assembly 508 includes a first actuator, shown as lower lift cylinder 544. The lower boom 540 is pivotally coupled (e.g., pinned, etc.) to the turntable 504 at a joint or lower boom pivot point. The lower lift cylinder 544 (e.g., a pneumatic cylinder, an electric actuator, a hydraulic cylinder, etc.) is coupled to the turntable 504 at a first end and coupled to the lower boom 540 at a second end. The lower lift cylinder 544 may be configured to raise and lower the lower boom 540 relative to the turntable 504 about the lower boom pivot point.

The boom assembly 508 further includes a second actuator, shown as upper lift cylinder 546. The upper boom 542 is pivotally coupled (e.g., pinned) to the upper end of the lower boom 540 at a joint or upper boom pivot point. The upper lift cylinder 546 (e.g., a pneumatic cylinder, an electric actuator, a hydraulic cylinder, etc.) is coupled to the upper boom 542. The upper lift cylinder 546 may be configured to extend and retract to actuate (e.g., lift, rotate, elevate, etc.) the upper boom 542, thereby raising and lowering a distal end of the upper boom 542.

As shown in FIG. 7, the application kit 80 further includes an operator platform, shown as platform assembly 550, coupled to the distal end of the upper boom 542 by an extension arm, shown as jib arm 552. The jib arm 552 may be configured to pivot the platform assembly 550 about a lateral axis (e.g., to move the platform assembly 550 up and down, etc.) and/or about a vertical axis (e.g., to move the platform assembly 550 left and right, etc.).

According to an exemplary embodiment, the platform assembly 550 provides a platform configured to support one or more operators or users. In some embodiments, the platform assembly 550 includes accessories or tools configured for use by the operators. In one embodiment, the platform assembly 550 includes pneumatic tools (e.g., an impact wrench, airbrush, nail gun, ratchet, etc.), plasma cutters, welders, spotlights, etc. In other embodiments, the platform assembly 550 includes a control panel (e.g., a user interface, a removable or detachable control panel, etc.) configured to control operation of the boom lift 500 (e.g., the turntable 504, the boom assembly 508, etc.) from the platform assembly 550 or remotely. In other embodiments, the platform assembly 550 is omitted, and the boom lift 500 includes an accessory and/or tool (e.g., forklift forks, etc.) coupled to the distal end of the boom assembly 508.

Figure 8:
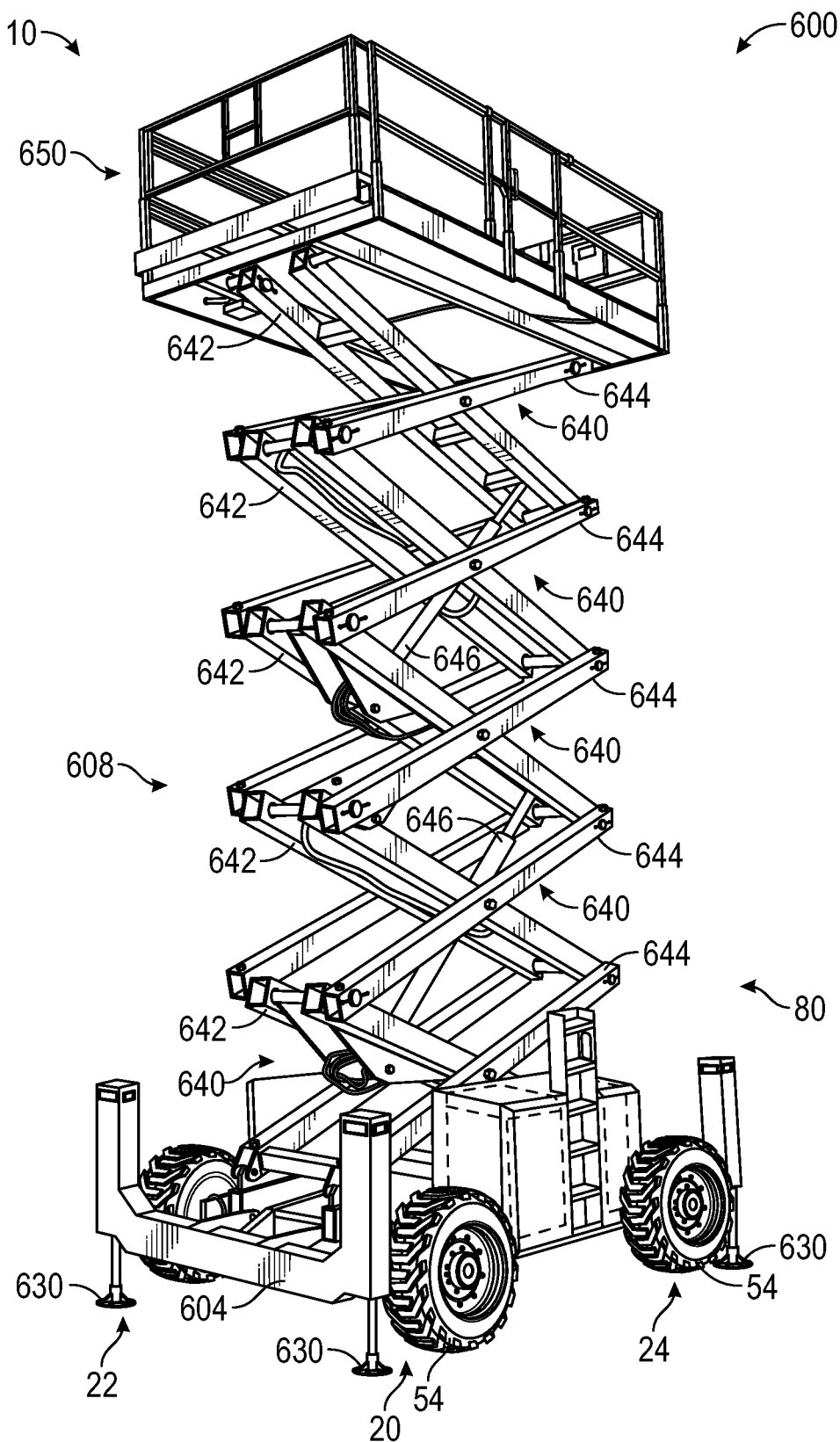
FIG. 8 is a perspective view of the vehicle of FIG. 1 configured as a scissor lift, according to an exemplary embodiment.

According to an exemplary embodiment, as shown in FIG. 8, the vehicle 10 is configured as a lift device, shown as scissor lift 600. As shown in FIG. 8, the application kit 80 includes a body, shown as lift base 604, coupled to the chassis 20. The lift base 604 is coupled to a scissor assembly, shown as lift assembly 608, such that the lift base 604 supports the lift assembly 608. The lift assembly 608 is configured to extend and retract, raising and lowering between a raised position and a lowered position relative to the lift base 604.

As shown in FIG. 8, the lift base 604 includes a series of actuators, stabilizers, downriggers, or outriggers, shown as leveling actuators 630. The leveling actuators 630 may extend and retract vertically between a stored position and a deployed position. In the stored position, the leveling actuators 630 may be raised, such that the leveling actuators 630 do not contact the ground. Conversely, in the deployed position, the leveling actuators 630 may engage the ground to lift the base assembly 604. The length of each of the leveling actuators 630 in their respective deployed positions may be varied in order to adjust the pitch (e.g., rotational position about a lateral axis) and the roll (e.g., rotational position about a longitudinal axis) of the base assembly 604 and/or the chassis 20. Accordingly, the lengths of the leveling actuators 630 in their respective deployed positions may be adjusted to level the base assembly 604 with respect to the direction of gravity (e.g., on uneven, sloped, pitted, etc. terrain). The leveling actuators 630 may lift the wheel and tire assemblies 54 off of the ground to prevent movement of the scissor lift 600 during operation. In other embodiments, the leveling actuators 630 are omitted.

According to an exemplary embodiment, the lift assembly 608 includes a series of subassemblies, shown as scissor layers 640, each including a pair of inner members 642 and a pair of outer members 644. The scissor layers 640 may be stacked atop one another in order to form the lift assembly 608. The inner members 642 may be pivotally coupled to the outer members 644 near the center of both the inner members 642 and the outer members 644. In this regard, the inner members 642 may pivot relative to the outer members 644 about a lateral axis. Each of the inner members 642 and the outer members 644 may include a top end and a bottom end. The bottom end of each inner member 642 may be pivotally coupled to the top end of the outer member 644 immediately below it, and the bottom end of each outer member 644 may be pivotally coupled to the top end of the inner member immediately below it. Accordingly, each of the scissor layers 640 may be coupled to one another such that movement of one scissor layer 640 causes a similar movement in all of the other scissor layers 640. The bottom ends of the inner member 642 and the outer member 644 that make up the lowermost scissor layer 640 may be coupled to the base assembly 604. The top beds of the inner member 642 and the outer member 644 that make up the uppermost scissor layer 640 may be coupled to the platform assembly 650. In some embodiments, scissor layers 640 may be added to, or removed from, the lift assembly 608 in order to increase, or decrease, the fully extended height of the lift assembly 608.

As shown in FIG. 8, the lift assembly 608 also includes one or more lift actuators 646 (e.g., hydraulic cylinders, pneumatic cylinders, motor-driven leadscrews, etc.) configured to extend and retract the lift assembly 608. The lift actuators 646 may be pivotally coupled to an inner member 642 at a first end and pivotally coupled to an inner member 642 of another scissor layer 640 at a second end. In an exemplary embodiment, these inner members 642 belong to a first scissor layer 640 and a second scissor layer 640 (which may be separated by a third scissor layer 640). In other embodiments, the lift actuators 646 are arranged in other configurations (e.g., the first scissor layer 640 and the second scissor layer 640 are not separated by a third scissor layer 640, etc.).

According to an exemplary embodiment, as distal or upper end of the lift assembly 608 is coupled to an operator platform, shown as platform assembly 650. The lift actuators 646 may be configured to actuate the lift assembly 608 to selectively reposition the platform assembly 650 between a lowered position (e.g., where the platform assembly 650 is proximate to the lift base 604) and a raised position (e.g., where the platform assembly 650 is at an elevated height relative to the lift base 604). Specifically, in some embodiments, extension of the lift actuators 646 moves the platform assembly 650 upward (e.g., extending the lift assembly 608), and retraction of the lift actuators 646 moves the platform assembly 650 downward (e.g., retracting the lift assembly 608). In other embodiments, extension of the lift actuators 646 retracts the lift assembly 608, and retraction of the lift actuators 646 extends the lift assembly 608. In some embodiments, the outer members 644 are parallel to and/or in contact with one another when the lift assembly 608 is in the stored position.

In some embodiments, the platform assembly 650 includes a platform that is configured to support one or more operators or users. Similar to the platform assembly 550, the platform assembly 650 may include accessories or tools (e.g., pneumatic tools, plasma cutters, welders, spotlights, etc.) configured for use by an operator. The platform assembly 650 may include a control panel to control operation of the scissor lift 600.

Figure 9A:
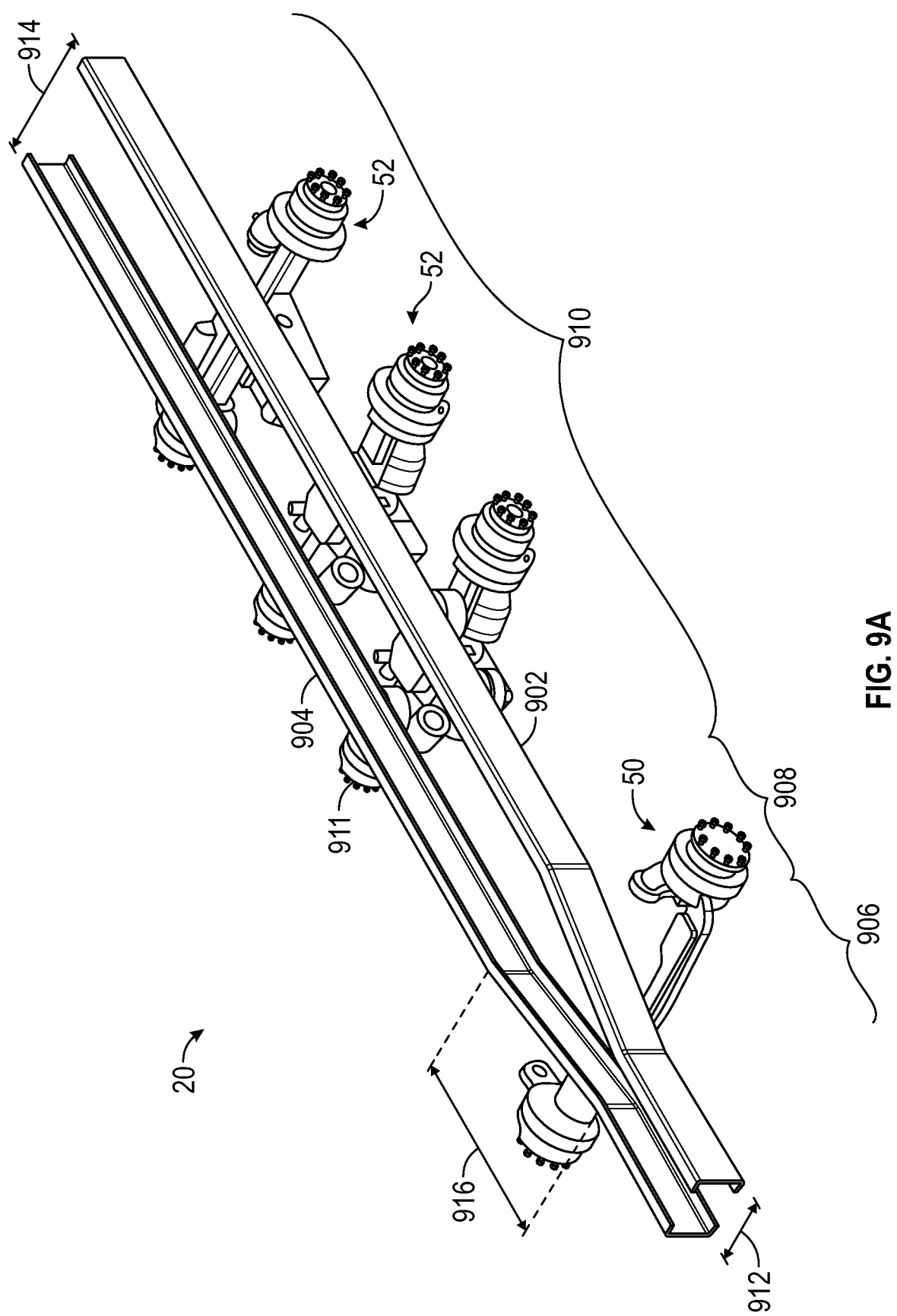
FIG. 9A is a perspective view of a chassis of the vehicle of FIG. 1, according to an exemplary embodiment.

According to an exemplary embodiment, as shown in FIG. 9A, the chassis 20 of a vehicle 10 includes a first frame rail, shown as frame rail 902, and a second frame rail, shown as frame rail 904. The first frame rail 902 and the second frame rail 904 may extend continuously along the entire length of the vehicle 10. In other embodiments, the first and second frame rails 902, 904 extend only a portion of the length of the vehicle 10. In one embodiment, the first frame rail 902 is parallel to the second frame rail 904. In another embodiment, at least one portion of the first frame rail 902 is parallel to at least one portion of the second frame rail 904. In another embodiment, the first frame rail 902 and the second frame rail 904 have a uniform cross-section along the entire length of the frame rails 902, 904. In such an embodiment, each frame rail 902, 904 defines a constant size and shape along the entire frame rail 902, 904. In another embodiment, the first frame rail 902 and the second frame rail 904 do not have a uniform cross-section along the entire length of the frame rails 902, 904. In some embodiments, the first frame rail 902 mirrors the second frame rail 904 (e.g., the first frame rail 902 and the second frame rail 904 define reflective symmetry about a center axis extending longitudinally along a centerline of the chassis 20). In other embodiments, the first frame rail 902 is different from the second frame rail 904.

According to an exemplary embodiment, as shown in FIG. 9A, the chassis 20 includes three sections. The chassis 20 may include a first section, shown as front portion 906, a second section, shown as transition portion 908, and a third section, shown as rear portion 910. The front portion 906 may correspond to a front portion of the first frame rail 902 and a front portion of the second frame rail 904. The transition portion 908 may correspond to a transition portion of the first frame rail 902 and a transition portion of the second frame rail 904. The rear portion 910 may correspond to a rear portion of the first frame rail 902 and a rear portion of the second frame rail 904. The front portion 906 may define a width, shown as first width 912. The first width 912 may be defined by a distance laterally between an exterior of the front portion of the first frame rail 902 and an exterior of the front portion of the second frame rail 904. The rear portion 910 may define a width, shown as second width 914. The second width 914 may be defined by a distance laterally between an exterior of the rear portion of the first frame rail 902 and an exterior of the rear portion of the second frame rail 904. In one embodiment, the first width 912 is smaller than the second width 914. In such an embodiment, the chassis 20 comprises an inward-offset rail configuration. In another embodiment, the first width 912 is larger than the second width 914. In such an embodiment, the chassis 20 comprises an outward-offset rail configuration. In another embodiment, the first width 912 and the second width 914 are the same. In other embodiments, the chassis 20 has more or less sections.

In one embodiment, the front portion 906 is disposed at the same elevation (e.g., a height off a ground on which the vehicle 10 travels) as the rear portion 910. In another exemplary embodiment, the front portion 906 is disposed at a different elevation than the rear portion 910. In one embodiment, the front portion 906 is disposed lower than the rear portion 910. In another embodiment, the front portion 906 is disposed higher than the rear portion 910.

In one embodiment, the front portions of the frame rails 902, 904 are the same size as the rear portions of the frame rails 902, 904. The front portions of the frame rails 902, 904 may have the same length as the rear portions of the frame rails 902, 904. The front portions of the frame rails 902, 904 may have the same width as the rear portions of the frame rails 902, 904. In another embodiment, the front portions of the frame rails 902, 904 are a different size than the rear portions of the frame rails 902, 904. The front portions of the frame rails 902, 904 may have a different length than the rear portions of the frame rails 902, 904. In one embodiment, the front portions of the frame rails 902, 904 is longer than the rear portions of the frame rails 902, 904. In another embodiment, the front portions of the frame rails 902, 904 is shorter than the rear portions of the frame rails 902, 904.

According to an exemplary embodiment, the transition portion 908 couples the front portion 906 with the rear portion 910. As shown in FIG. 9A, the transition portion 908 extends from a rear side of the front portion 906 to a front side of the rear portion 910. According to an exemplary embodiment, the transition portion 908 is oriented at an angle compared to the front portion 906 and the rear portion 910 (e.g., not parallel to the first portion 906 or the rear portion 910). The transition portion 908 may be any size, shape, or orientation configured to couple the front portion 906 with the rear portion 910. In an exemplary embodiment, the transition portion 908 is oriented at a gradual angle to couple the front portion 906 with the rear portion 910. A gradual angle may be any angle between zero and ninety degrees. A length of the transition portion 908, shown as length 916, may be based, in part, on the angle of orientation. In another embodiment, the transition portion 908 is oriented at a sharper angle. According to an exemplary embodiment, the transition portion 908 is oriented at a ninety-degree angle. The transition portion 908 oriented at a sharper angle may have a shorter length 916 than a transition portion 908 oriented at a more gradual angle. The size, shape, or orientation of the transition portion 908 of the first frame rail 902 may be the same as the size, shape, or orientation of the transition portion 908 of the second frame rail 904. Being the same may mean the transition portion 908 of the first frame rail 902 is mirroring the transition portion 908 of the second frame rail 904. In another embodiment, the size, shape, or orientation of the transition portion 908 of the first frame rail 902 is different from the size, shape, or orientation of the second frame rail 904.

According to an exemplary embodiment, the transition portion 908 supports a front axle 50 of the vehicle 10 and the rear portion 910 supports a rear axle 52. In another embodiment, the front portion 906 supports the front axle 50 and the rear portion supports the rear axle 52. In another embodiment, the rear portion 910 supports the front axle 50 and the rear axle 52. Any portion of the chassis 20 may support any combination of front and rear axles 50, 52.

In another embodiment, the chassis 20 supports an auxiliary axle, shown as auxiliary axle 911. The auxiliary axle 911 may be a pusher axle disposed in front of a front-most drive axle (e.g., a front-most one of the rear axles 52). In other embodiments, the auxiliary axle 911 is a tag axle disposed behind a rear-most drive axle (e.g., a rear-most one of the rear axles 52). The auxiliary axle 911 may be coupled with the chassis 20. The auxiliary axle 911 may be coupled with any portion of the chassis 20. In other embodiments, the auxiliary axle 911 is coupled to an external frame of the vehicle 10. In one embodiment, the external frame is coupled with the chassis 20 such that the auxiliary axle 911 is disposed at a location offset from the chassis 20 (e.g., behind a back end of the chassis 20). In some embodiments, the auxiliary axle 911 may be configured to move between a first position (e.g., a passive position) and a second position (e.g., an active position). When in the first position, the auxiliary axle 911 may be disposed at an elevation such that a wheel and tire assembly 54 coupled with the auxiliary axle 911 does not contact a support surface (e.g., the ground). In the first position, the auxiliary axle 911 may provide no support for the weight of the vehicle 10. When in the second position, the auxiliary axle 911 may be disposed at an elevation such that the wheel and tire assembly 54 coupled with the auxiliary axle 911 does contact a support surface (e.g., the ground). In the second position, the auxiliary axle 911 does provide support for the weight of the vehicle 10.

In some embodiments, the chassis 20 does not have a transition portion 908. The chassis 20 may include only one portion that extends the whole length of the vehicle 10. In other embodiments, the chassis 20 may include a front portion 906 that extends from a front side of the rear portion 910. In another embodiment, the front portion 906 and the rear portion 910 can overlap.

Figure 9B:
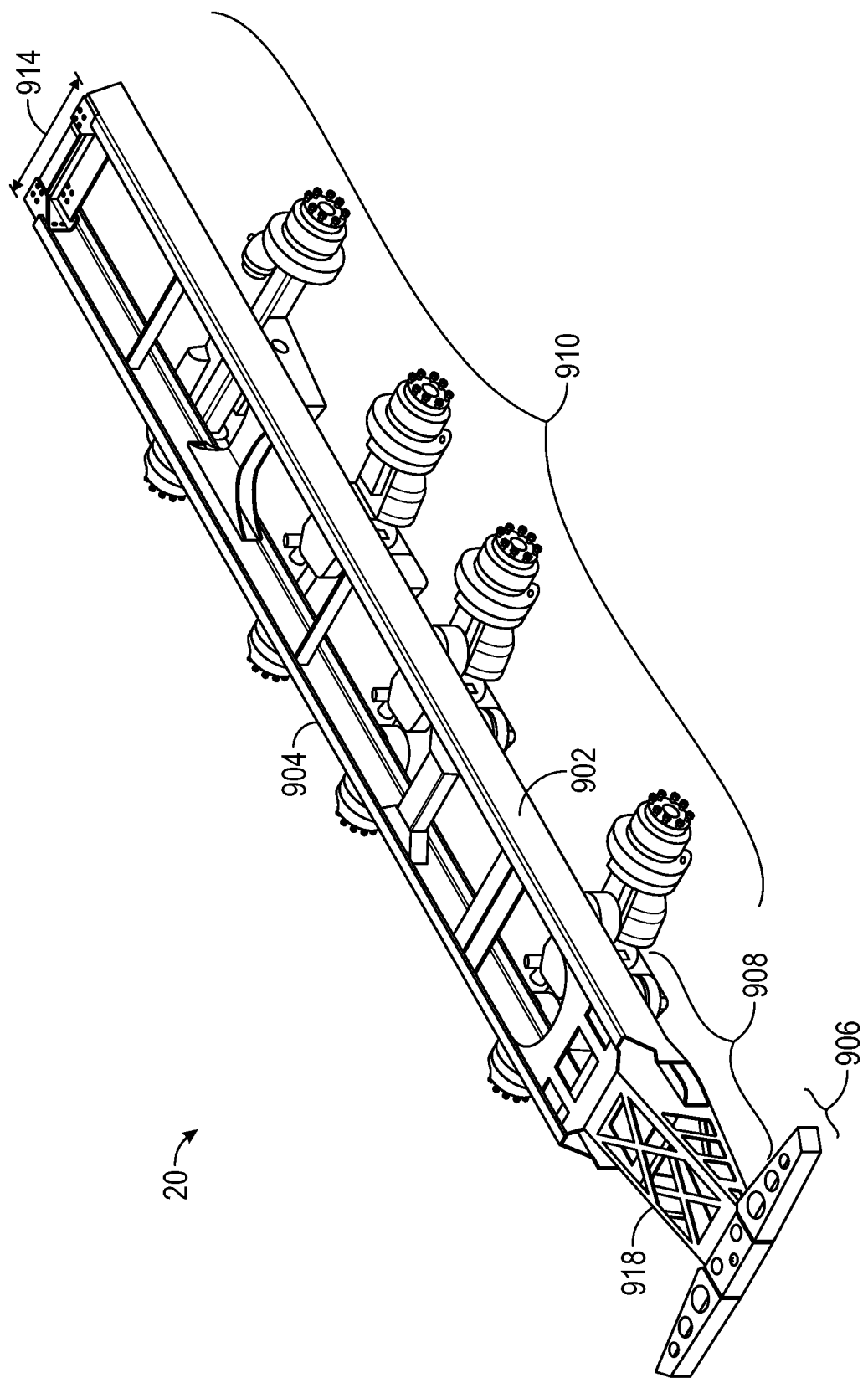
FIG. 9B is a perspective view of a chassis of the vehicle of FIG. 1, according to an exemplary embodiment.

According to another exemplary embodiment, as shown in FIG. 9B, the chassis 20 can include a first frame rail 902, a second frame rail 904, and an extension structure, shown as frame extension 918. The frame extension 918 may comprise a single section or the frame extension 918 may comprise a plurality of sections. In one embodiment, the first frame rail 902 and the second frame rail 904 comprise a rear portion 910 of the chassis 20 and the frame extension 918 comprises a front portion 906 of the chassis 20. In another embodiment, the frame extension 918 comprises the front portion 906 and a transition portion 908 of the chassis 20. In some embodiments, the frame extension 918 is configured to bolt to the frame rails 902, 904 of the chassis 20. As shown in FIG. 9B, the frame extension 918 is configured to fit between the frame rails 902, 904 such that the frame extension 918 can be bolted to an inner surface of each frame rail 902, 904. The frame extension 918 may also be bolted to other portions of the frame rails 902, 904 (e.g., flanges, top, bottom, etc.). In another embodiment, the frame rails 902, 904 fit inside the frame extension 918. In such an embodiment, the frame extension 918 is configured to be bolted to an outer surface of each frame rail 902, 904.

According to an exemplary embodiment, as shown in FIG. 9B, the frame extension 918 defines the transition portion 908 and the front portion 906. The transition portion 908 may be at least partially disposed between the first frame rail 902 and the second frame rail 904. The frame extension 918 may be coupled with the frame rails 902, 904. In some embodiments, the frame extension 918 is bolted to the inside of the frame rails 902, 904. In one embodiment, the transition portion 908 extends forward from the frame rails 902, 904. In another embodiment, the frame extension 918 is a single portion (e.g., does not include both a front portion 906 and a transition portion 908) such that the frame extension 918 is capable of supporting the cab 40. As shown in FIG. 9B, the frame extension 918 starts with a height similar to the height of the frame rails 902, 904. In one embodiment, that height of the frame extension 918 can extend until the front portion 906. In another embodiment, the frame extension 918 can taper downwardly as it extends toward the front portion 906 such that a front of the frame extension 918 is at a lower height than a back of the frame extension 918. In other embodiments, the front of the frame extension 918 defines a height that is greater than the back of the frame extension 918. In another embodiment, at least part of the frame extension 918 has a width similar to the width 914 of the rear portion 910 of the chassis 20 (e.g., the frame extension 918 can couple with both frame rails 902, 904). In another embodiment, the frame extension 918 defines more than one width. In one embodiment, the transition portion 908 of the frame extension 918 has a first width and the front portion 906 has a second width. In another embodiment, the transition portion 908 includes a first width and a second width, and the front portion 906 includes a third width. In such an example, the transition portion 908 starts with a width similar to the width 914 of the rear portion 910 of the chassis 20 and becomes a different width as the frame extension 918 extends away from the rear portion 910 of the chassis 20. The width of the frame extension 918 may increase or decrease as it extends away from the rear portion 910. In one embodiment, the front portion 906 of the frame extension 918 extends in a direction perpendicular to the frame rails 902, 904. In some embodiments, the front portion 906 has a width that is at least twice as wide as the part of the transition portion 908 that couples with the front portion 906.

Figure 10:
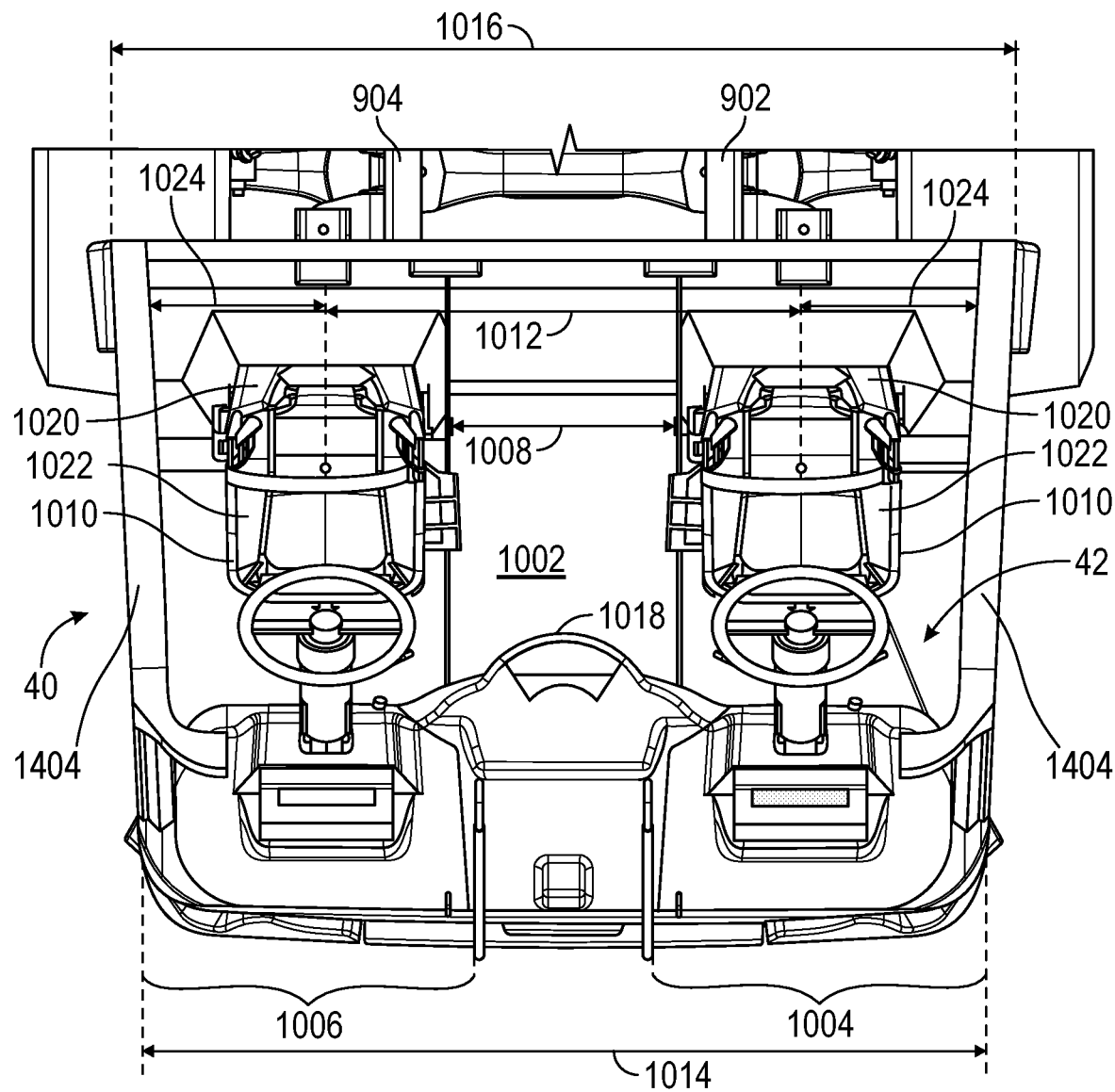
FIG. 10 is a top view of an interior of a cab of the vehicle of FIG. 1, according to an exemplary embodiment.
Figure 11:
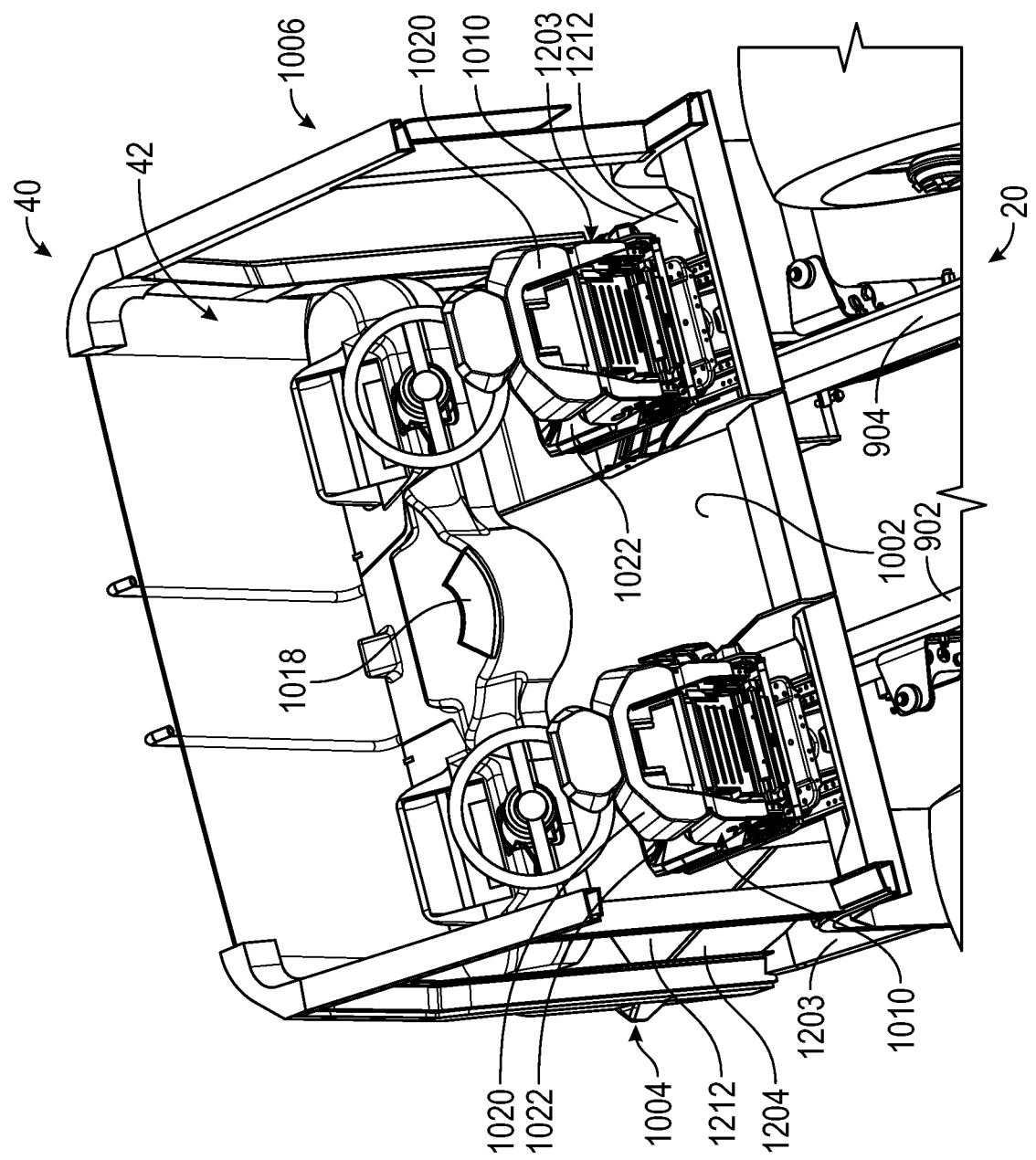
FIG. 11 is a perspective view of the interior of the can of FIG. 10.
Figure 12:
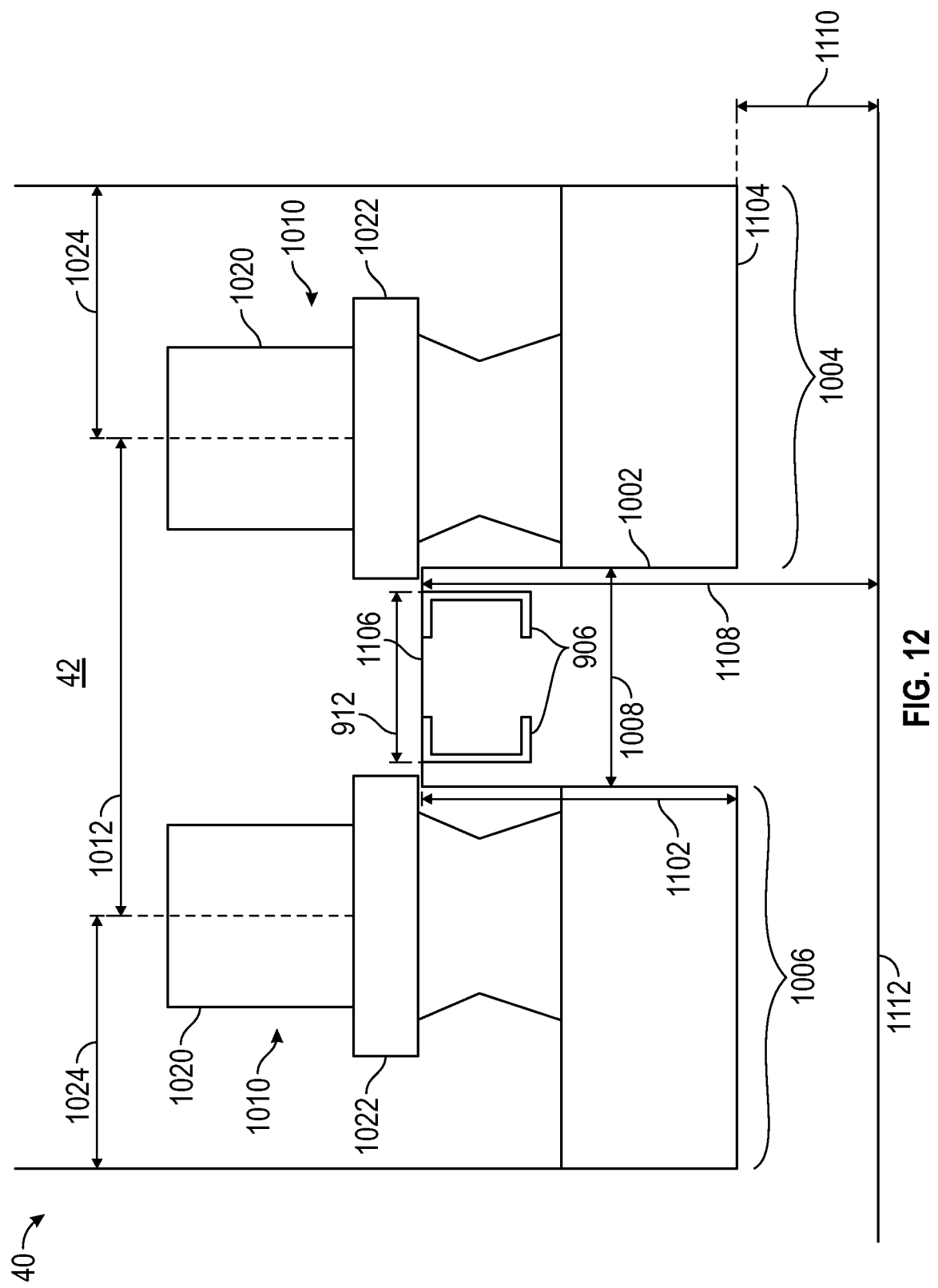
FIG. 12 is a cross-sectional view of the interior of the cab of the vehicle of FIG. 1, according to an exemplary embodiment.

According to an exemplary embodiment, as shown in FIGS. 10-12, a cab 40 of a vehicle 10 includes a tunnel, shown as tunnel 1002. The tunnel 1002 protrudes into a cab interior 42 and extends longitudinally along the cab 40 (e.g., in a direction substantially parallel to the frame rails 902, 904). The tunnel 1002 may be a recess defined by the body of the cab 40 that is configured to receive at least part of the chassis 20. In some embodiments, the cab 40 is supported by at least the front portion 906 of the chassis 20. In some embodiments, the front portion 906 of the chassis 20 is disposed within the tunnel 1002 and supports the chassis 20 via the tunnel 1002. In other embodiments, the front portion 906 of the chassis 20 is wider than the tunnel 1002 such that front portion 906 does not fit in the tunnel 1002. In such an embodiment, the bottom of the cab 40 rests on top of the front portion 906 of the chassis 20. In such an embodiment, a transition portion 908 of the chassis 20 may be configured to be disposed, at least partially, within the tunnel 1002 and couple with a front portion 906 that is disposed below the tunnel 1002. The tunnel 1002 may extend a full length of the cab 40 or may extend only part of the length of the cab 40. The tunnel 1002 may divide the cab interior 42 into sides, shown as first side 1004 and second side 1006. Both the first side 1004 and the second side 1006 may be configured to provide an operator of the vehicle 10 with room, comfort, and accessibility to operate the vehicle 10. The sides 1004, 1006 may be configured the same or they may be configured differently.

According to an exemplary embodiment, a width 1008 of the tunnel 1002 is based, at least in part, on the width 912 of the front portion 906 of the chassis 20. For example, the lateral width 1008 of the tunnel 1002 is greater than the width 912 defined laterally between exteriors of the first frame rail 902 and the second frame 904 rail at the front portion 906 of the chassis 20. This arrangement enables the front portion 906 of the chassis 20 to be at least partially received within the tunnel 1002, which efficiently supports the cab 40 on the chassis 20 and enables the cab 40 to define a smaller lateral width when compared due to conventional cab designs. The tunnel 1002 may have a width 1008 large enough to fit the front portion of the first frame rail 902 and the front portion of the second frame rail 904 within the tunnel 1002. The smaller the width 912, the smaller the width 1008 of the tunnel 1002 may be. In another embodiment, the width 1008 is smaller than the width 914 of the rear portion 910 of the chassis 20. In such an embodiment, the width 912 of the front portion 906 is smaller than the width 914 of the rear portion 910. The width 1008 of the tunnel 1002 may be configured to accommodate the front portion 906 and not the rear portion 910.

In another embodiment, a width 1008 of the tunnel is based, at least in part, on the width of a transition portion 908 of a frame extension 918. The frame extension 918 may extend within the tunnel 1002 such that the front portion 906 is disposed either within the tunnel 1002 or below the cab 40 so as to support at least a front portion of the cab 40.

As shown in FIGS. 10-12, each side 1004, 1006 of the cab 40 includes a seat 1010 for an operator, according to an exemplary embodiment. In other embodiments, only one side of the can includes a seat. The seat 1010 includes a back portion, shown as back rest 1020, and a bottom portion or cushion, shown as seat support 1022. In one embodiment, a location of the seat 1010 is based, at least in part, on the width 1008 of the tunnel 1002. The smaller the width 1008 of the tunnel 1002, the closer to the center of the cab 40 the seat 1010 may be. In other words, the smaller the width 1008 of the tunnel 1002, the closer a first seat 1010 may be laterally to a second seat 1010. According to an exemplary embodiment, a distance 1012 between a centerline of a first seat 1010 and a centerline of a second seat 1010 is less than or equal to about 45 inches. In one embodiment, the cab 40 includes a display 1018 fixed to a front console (e.g., dashboard) of the cab 40. The first seat 1010 and the second seat 1010 can be disposed such that an operator in both seats 1010 can access the display. The display 1018 may include input devices (e.g., buttons, switches, levers, pedals, etc.) or output devices (e.g., lights, gauges, speakers, etc.), or any combination thereof, that aid in the operation of the vehicle 10. The display 1018 may be configured to be accessible by an operator on either side 1004, 1006 of the cab 40 without having to move at all (e.g., all components are stationary), or with only moving slightly (e.g., swivel, tilt, etc.). In other embodiments, the cab 40 includes separate displays 1018 for each side 1004, 1006 of the cab 40.

According to an exemplary embodiment, the location of the seat 1010 provides adequate clearance, shown as clearance 1024, for an operator. In one embodiment, the location of the seat provides a shoulder clearance measured from a centerline of the seat 1010 to an inner surface of a door 1404 of the cab 40, or a component thereof (e.g., a window, a handle, an armrest), of greater than or equal to about 18 inches or greater than or equal to about 18.5 inches. In another embodiment, the location of the seat 1010 provides an elbow clearance measured from the centerline of the seat 1010 to an inner surface of a door 1404 of the cab 40 of greater than or equal to about 15 inches or greater than or equal to about 15.5 inches. In one embodiment, a window on a door of the cab 40 is positioned rearward to provide additional shoulder or elbow clearance.

The body of the cab 40 defines a front width 1014 and a rear width 1016. In general, the lateral widths 1014, 1016 defined by the cab 40 are smaller than convention cab designs, which enables the cab 40 to provide better visibility for an operator within the cab interior 42. In some embodiments, the widths 1014, 1016 may be measured from an exterior of a first side of the cab 40 to an exterior of a second side of the cab 40. In some embodiments, the front width 1014 is smaller than the back width 1016. In some embodiments, the front width 1014 is a maximum of about 80 inches. For example, the front width 1014 may be less than or equal to about 80 inches. In some embodiments, the rear width 1016 is maximum of about 86 inches. For example, the rear width may be less than or equal to about 86 inches.

According to an exemplary embodiment, as shown in FIG. 12, a height 1102 of the tunnel 1002 is based, at least in part, on a height 1108 of a top of the front portion 906 of the chassis 20. For example, the height 1102 of the tunnel 1002 may be defined between a bottom surface 1104 of the cab 40 and an uppermost surface or top 1106 of the tunnel 1002. In some embodiments, the height 1108 of the front portion 906 of the chassis 20 may be different than the height of the rear portion 910 of the chassis 20. According to an exemplary embodiment, a portion of the tunnel 1002 rests on top of the front portion 906 of the chassis 20. The portion of the tunnel 1002 may directly contact the chassis 20. Direct contact may include the tunnel 1002 directly contacting the chassis 20 without any other material separating the tunnel 1002 from the chassis 20. Direct contact may also include other material or small devices that are disposed between the tunnel 1002 and the chassis (e.g., padding, fasteners, supportive devices, etc.). In other embodiments, the chassis 20 contacts the tunnel 1002 indirectly. Indirect contact may include having a larger obstruction or piece of equipment disposed between the chassis 20 and the tunnel 1002 (e.g., an engine disposed in the tunnel 1002, etc.).

In some embodiments, a clearance distance 1110 is defined between the bottom surface 1104 of the cab 40 and a ground 1112. The clearance distance 1110 may have a minimum distance specified by industry standard. According to an embodiment, the industry standard for the clearance distance 1110 is 13 inches above the ground 1112 and the height 1108 of the top of the front portion 906 of the chassis 20 is about 35 inches. In such an embodiment, the height 1102 of the tunnel 1002 is about 22 inches.

In another embodiment, the height 1102 of the tunnel 1002 is based, at least on part, on a height of a top of the frame extension 918. The frame extension 918 may be disposed within the tunnel 1002 such that the height 1102 of the tunnel 1002 accommodates the height of the frame extension 918. The height of the frame extension 918 may vary so the height 1102 of the tunnel 1002 may vary accordingly.

According to an exemplary embodiment, the top 1106 of the tunnel 1002 is lower than a top of the seat support 1022 (e.g., closer to the ground 1112). In some embodiments, the top 1106 of the tunnel 1002 is lower than the entire seat support 1022. In such an embodiment, the seat 1010 may be positioned such that part of the seat support 1022 is disposed over the tunnel 1002. Similarly, an arm or shoulder of an operator sitting in the seat 1010 may be disposed above the tunnel 1002 since there is no obstruction preventing such arrangement. In general, arranging the uppermost surface or top 1106 of the tunnel 1002 below the seat supports 1022 enables the cab 40 to define a reduced lateral width (e.g., the front width 1014 and the rear width 1016), when compared to convention cab designs, because the seats 1010 are positioned laterally closer to one another (e.g., the distance 1012 is reduced when compared to convention cab designs).

Figure 13:
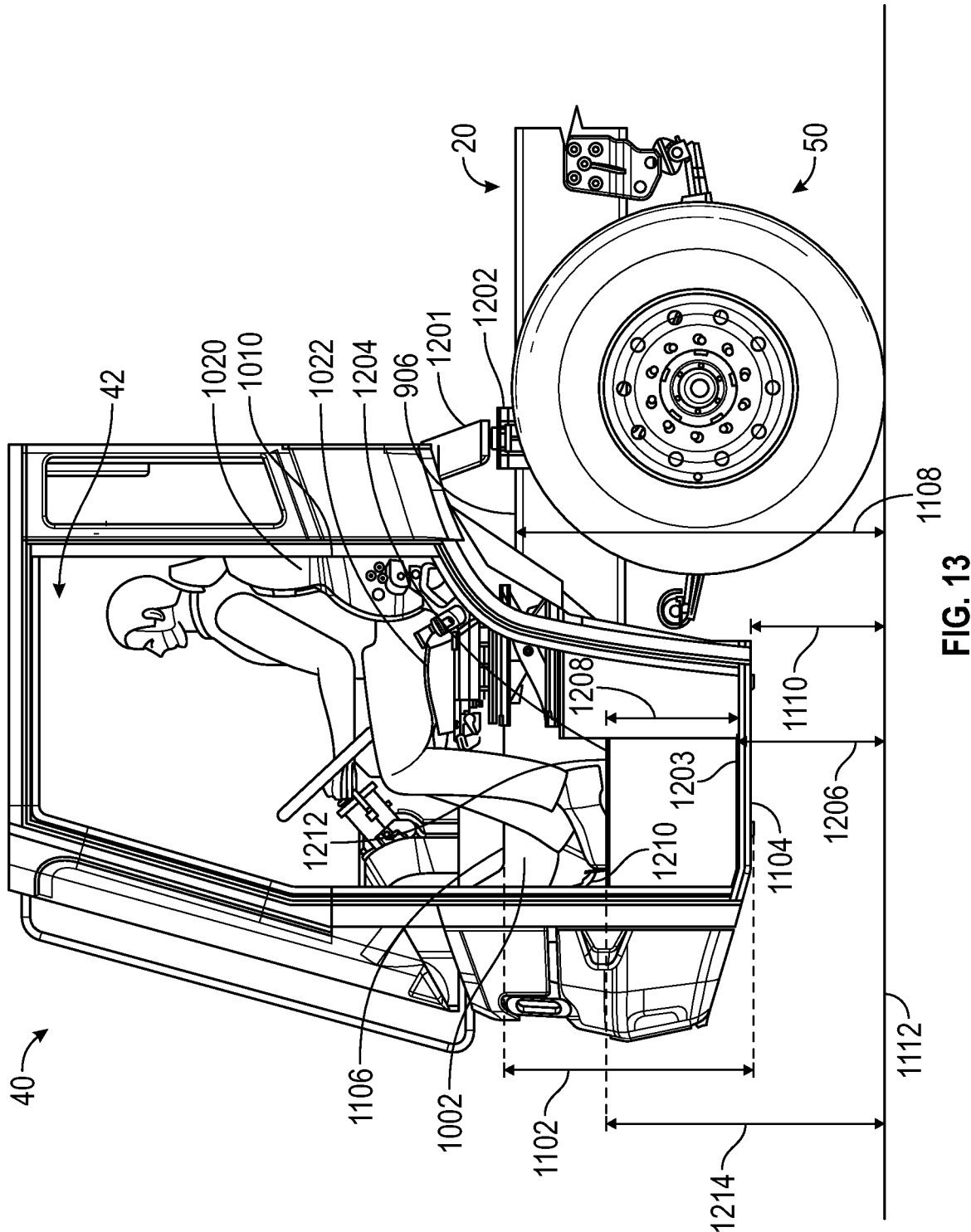
FIG. 13 is a side view of the interior of the cab of the vehicle of FIG. 10, according to an exemplary embodiment.

According to an exemplary embodiment, as shown in FIG. 13, a rear of the cab 40 is supported by an external support structure, shown as support arm 1201. Supporting the rear of the cab 40 with the support arm 1201 allows the cab 40 to extend over other elements of the vehicle 10 (e.g., a wheel and tire assembly 54) The support arm 1201 may be a part of the cab 40 or may be coupled to the cab 40. The support arm 1201 may extend from the cab 40 at any location such that an end of the support arm 1201 contacts a support point, shown as pad 1202. Pad 1202 may include cushioning devices (e.g., suspension devices) configured to reduce the impact of any forces felt by the vehicle 10. Pad 1202 may include receiving devices (e.g., notches, holes, rails, etc.) configured to keep the support arm 1201 in a desired location. In some embodiments, the pad 1202 is coupled to the chassis 20. In some embodiments, the pad 1202 is coupled with a side of the chassis 20. In other embodiments, the pad 1202 is coupled with a top of the chassis 20. The pad 1202 is configured to receive the end of the support arm 1201 and keep the cab 40 at a desired orientation. In some embodiments, a first support arm 1201 extends from the cab 40 and contacts a first pad 1202 coupled with a first frame rail 902 of the chassis 20 and a second support arm 1201 extends from the cab 40 and contacts a second pad 1202 coupled with a second frame rail 904. In another embodiment, a support arm 1201 extends from the cab 40 and splits into two support arms 1201, each configured to contact a different frame rail 902, 904. In another embodiment, a support arm 1201 extends from the cab 40 and contacts a pad 1202 disposed between the two frame rails 902, 904. The pad 1202 may extend between the first frame rail 902 and the second frame rail 904 such that the support arm 1201 contacts the pad 1202 at a location between the first frame rail 902 and the second frame rail 904. The support arm 1201 may also be configured to contact a portion of the frame extension instead of, or along with, the frame rails 902. 904.

According to an exemplary embodiment, the cab 40 is supported by the chassis 20 via the tunnel 1002. In one embodiment, an entire length of the tunnel 1002 rests upon the front portion 906 of the chassis 20. In another embodiment, a portion of the tunnel 1002 rests upon a front portion 906 of the chassis 20. The portion of the tunnel 1002 may be a front portion. A rear portion of the tunnel 1002 may be supported by the support arm 1201. In another embodiment, the cab 40 is supported by the frame extension 918 of the chassis 20. The frame extension 918 may support the cab 40 via the tunnel 1002. In one embodiment, the front portion 906 of the frame extension 918 is disposed within the tunnel 1002 such that at least the front of the tunnel 1002 is supported by the frame extension 918. In another embodiment, the front portion 906 of the frame extension 918 is wider than the tunnel 1002 and is disposed below the tunnel 1002 such that the bottom of the cab 40 rests on, and is supported by, the front portion 906 of the frame extension 918.

According to an exemplary embodiment, as shown in FIG. 13, the first side 1004 of the cab 40 is configured to accommodate an operator in a seated position. In such an embodiment, the seat support 1022 of the seat 1010 is substantially horizontal such that a person sitting on the seat 1010 does not need additional support to remain on the seat 1010 (e.g., feet do not need to be on the floor to keep the person in the seat). In some embodiments, the second side 1006 is configured to accommodate an operator in a seated position. In some embodiments, the first side 1004 is configured to accommodate an operator in a seated position and the second side 1006 is configured to accommodate an operator in a non-seated or standing position (see, e.g., FIG. 11).

In some embodiment, the first side 1004 includes a multi-step entry. The multi-step entry may include a plurality of steps. For example, the multi-step entry may include a first step 1203 and a second step 1204. A first step height 1206 may be defined by a distance between the ground 1112 and the first step 1203. A second step height 1208 may be defined by a distance between the first step 1203 and the second step 1204. According to an exemplary embodiment, the first step height 1206 is substantially equal the second step height 1208 (e.g., +/−0.5 inches). The approximately equal distance between both the ground 1112 and the first step 1203, and between the first step 1203 and the second step 1204 provides an ergonomically efficient entry for an operator entering the first side 1004 of the cab 40. In one embodiment, the first step height 1206 is about 15 inches and the second step height 1208 is about 15 inches. In other embodiments, the sides 1004, 1006 are configured for a seated position with a single-step entry.

In one embodiment, the second step 1204 extends throughout at least a portion of the cab 40 to define a floor 1212. A person entering the cab 40 may stand on the floor 1212 or may rest their feet on the floor 1212 when in a seated position. When in a seated configuration, a pedal 1210 for controlling a subsystem of the vehicle 10 (e.g., gas pedal, brake, clutch, etc.) is disposed above the floor 1212 at a location where a user can use their foot to actuate the pedal 1210. According to an exemplary embodiment, the second step 1204 is disposed at an height that is below the top of the front portion 906 of the chassis 20, and is therefore below the top 1106 of the tunnel 1002. In one embodiment, a height 1214 of the floor 1212 is approximately 30 inches measured above the ground 1112. The height 1214 of the floor 1212, and all of the heights described herein relative to the ground 1112, may be measured in an unloaded bare chassis condition.

Figure 14:
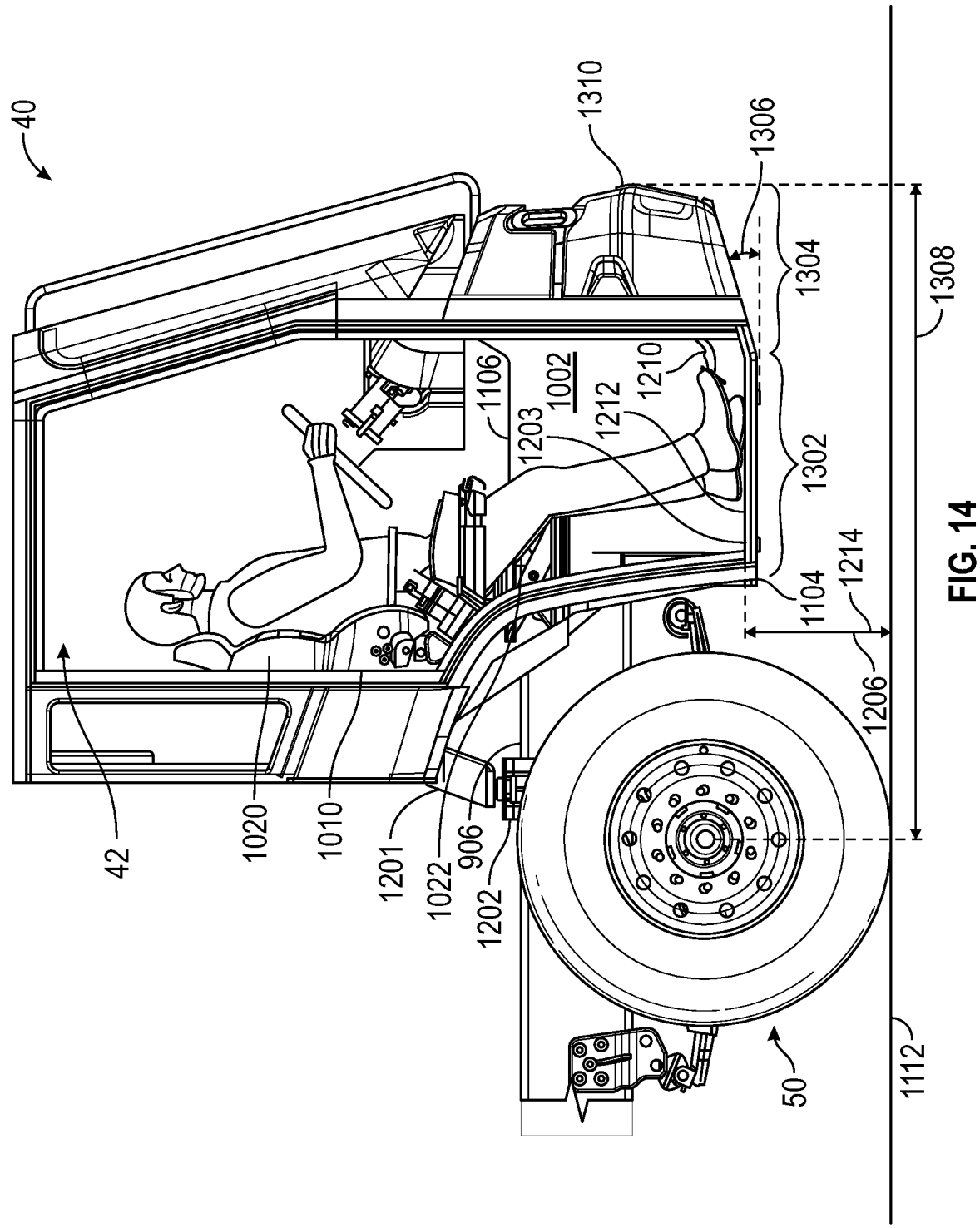
FIG. 14 is a side view of the interior of the cab of the vehicle of FIG. 10, according to an exemplary embodiment.

According to another exemplary embodiment, as shown in FIG. 14, the second side 1006 of the cab 40 is configured to accommodate an operator in a non-seated or standing configuration. In such an embodiment, the seat support 1022 of the seat 1010 on the second side 1006 is oriented at an angle such that a person can be in a more upright position (e.g., not arranged parallel to the ground 1112). The standing configuration may include the person supporting themselves with their feet on the floor 1212 of the cab 40. In some embodiments, the first side 1004 is configured to accommodate an operator in a non-seated position. In other embodiments, neither side 1004, 1006 is configured to accommodate an operator in a non-seated position. In other embodiments, both sides 1004, 1006 are configured to accommodate an operator in a non-seated position.

According to an exemplary embodiment, the second side 1006 configured for a non-seated position includes a single-step entry. In one embodiment, the single-step entry includes the first step 1203 and not the second step 1204. The height 1206 of the first step 1203 may be defined by the distance between the ground 1112 and the first step 1203. In one embodiment, the first step 1203 extends throughout at least a portion of the cab 40 to define the floor 1212. In such an embodiment, the height 1206 is the same as the floor height 1214. When in a non-seated configuration, a pedal 1210 for controlling a subsystem of the vehicle 10 (e.g., gas pedal, brake, clutch, etc.) is disposed above the floor 1212 at a location where a user can use their foot to actuate the pedal 1210. According to an exemplary embodiment, the first step 1203 is disposed at an height below the top of the front portion 906 of the chassis 20, and therefore is below the top 1106 of the tunnel 1002. In one embodiment, the floor height 1214 is approximately 15 inches measured from the ground 1112. In other embodiments, the second side 1006 includes a multi-step entry.

According to an exemplary embodiment, the bottom of the cab 40 includes a plurality of sections. In one embodiment, the bottom surface 1104 of the cab 40 includes two sections, shown as flat portion 1302 and angled portion 1304. The flat portion 1302 includes the area used as the floor 1212 or the first step 1203. The flat portion 1302 is substantially planar such that it provides a flat surface for an operator to stand on to enter the cab 40. In some embodiments, the angled portion 1304 is in front of the flat portion 1302 (e.g., closer to a grill, a front bumper, or a headlight of the cab 40). In some embodiments, the angled portion 1304 is oriented at an acute angle with respect to the flat portion 1302. In some embodiments, the angled portion 1304 has an angle of approach, shown as angle 1306. The angle 1306 may be approximately 15 degrees.

In some embodiments, the cab 40 includes an overhang, shown as front overhang 1308. The front overhang 1308 may be measured from a front axle 50 to a bumper, shown as front bumper 1310. In one embodiment, the front overhang 1308 is less than or equal to about 74 inches.

In some embodiments, the seat configuration of the cab 40 can switch between a seated configuration (FIG. 13) and a non-seated configuration (FIG. 14). A plurality of systems or components may move in order to switch between a seated and a non-seated configuration. In some embodiments, the seat 1010, the second step 1204, and the pedal 1210 are reconfigured or moved to accommodate a different configuration. For example, the seat support 1022 may pivot between a substantially horizontal orientation (e.g., approximately parallel to the ground 1112) and a sloped orientation (e.g., not parallel to the ground 1112 where a front of the seat support 1022 is arranged closer to the floor 1212). In one embodiment, the seat 1010 can include a mechanism (e.g., button, lever, switch, etc.), or a combination of mechanisms, that allow a user to manually change the orientation of the seat 1010. Changing the orientation of the seat may include moving portions of the seat 1010 (e.g., tilting the seat support 1022 to be oriented at an angle) or removing or replacing elements of the seat 1010 (e.g., taking off or replacing seat cushions). In another embodiment, the cab 40 can include an automatic mechanism that automatically changes the orientation of the seat 1010 based on an input from a user. In one embodiment, the automatic mechanism includes storing user preferences in a computer system such that the seat can automatically reorient itself to a predefined position based on an input from the user (e.g., the user pushes a button and the seat 1010 moves to a preferred sloping angle previously defined by the user). When switching between a seated configuration and a non-seated configuration, all components of the seat 1010 may be adjustable (e.g., the back rest 1020, the seat support 1022, an armrest, a head rest, etc.). Components of the cab 40 that are not a part of the seat 1010 may also be adjustable (e.g., the steering wheel, pedals, controls, etc.).

According to an exemplary embodiment, to switch between a seated configuration and a non-seated configuration, the second step 1204 may move between an active position and a collapsed position. In the active position, the second step 1204 provides a floor 1212 for the cab 40. The floor 1212 is configured to support the weight of the user at an height above the first step 1203, wherein the height is more than just a thickness of the material of the second step 1204. In such an embodiment, the pedal 1210 for controlling the vehicle 10 is disposed above the second step 1204. In the collapsed position, the second step 1204 is removed from the cab 40 such that the first step 1203 provides the floor 1212 for the cab 40. In one embodiment, removing the second step 1204 from the cab 40 includes taking the physical step out of the vehicle 10. In another embodiment, removing the second step 1204 from the cab 40 includes swinging the second step 1204 from a horizontal position to a vertical position such that an operator can no longer step on the second step 1204. In another embodiment, removing the second step 1204 includes collapsing the second step 1204 such that it sits flat on top of the first step 1203.

According to an exemplary embodiment, to switch between a seated configuration and a non-seated configuration, the pedal 1210 may move between a lower position and a higher position. The pedal 1210 may be in the higher position when in the seated configuration. The pedal 1210 may be in the higher position when the second step 1204 is in the active position. The pedal 1210 may be in the lower position when in the non-seated position. The pedal 1210 may be in the lower position when the second step 1204 is in the collapsed position. In another exemplary embodiment, a cab 40 may include a plurality of pedals 1210. For example, a first pedal 1210 may be configured to be used when in the seated configuration and a second pedal 1210 may be configured to be used when in the non-seated configuration.

In general, either side 1004, 1006 of the cab 40 may define the seated position/configuration or the non-seated position/configuration. Regardless of the seat configuration, the seat 1010 can be adjusted and moved to increase comfort of an operator. In some embodiments, the seat 1010 can slide longitudinally (e.g., forward and backward) to provide more or less distance between the seat 1010 and the front of the cab 40. In one embodiment, the seat 1010 can slide between about 8 inches and about 9 inches, or about 8.7 inches. In other embodiments, the seat 1010 includes a vertical suspension (e.g., can travel up and down when on uneven roads, etc.). In some embodiments, the seat 1010 has a vertical suspension travel of about 6 inches. In other embodiments, the seat 1010 can recline (e.g., an angle of the back rest 1020 can change). In some embodiments, the seat 1010 can recline about 13 degrees.

Figure 15:
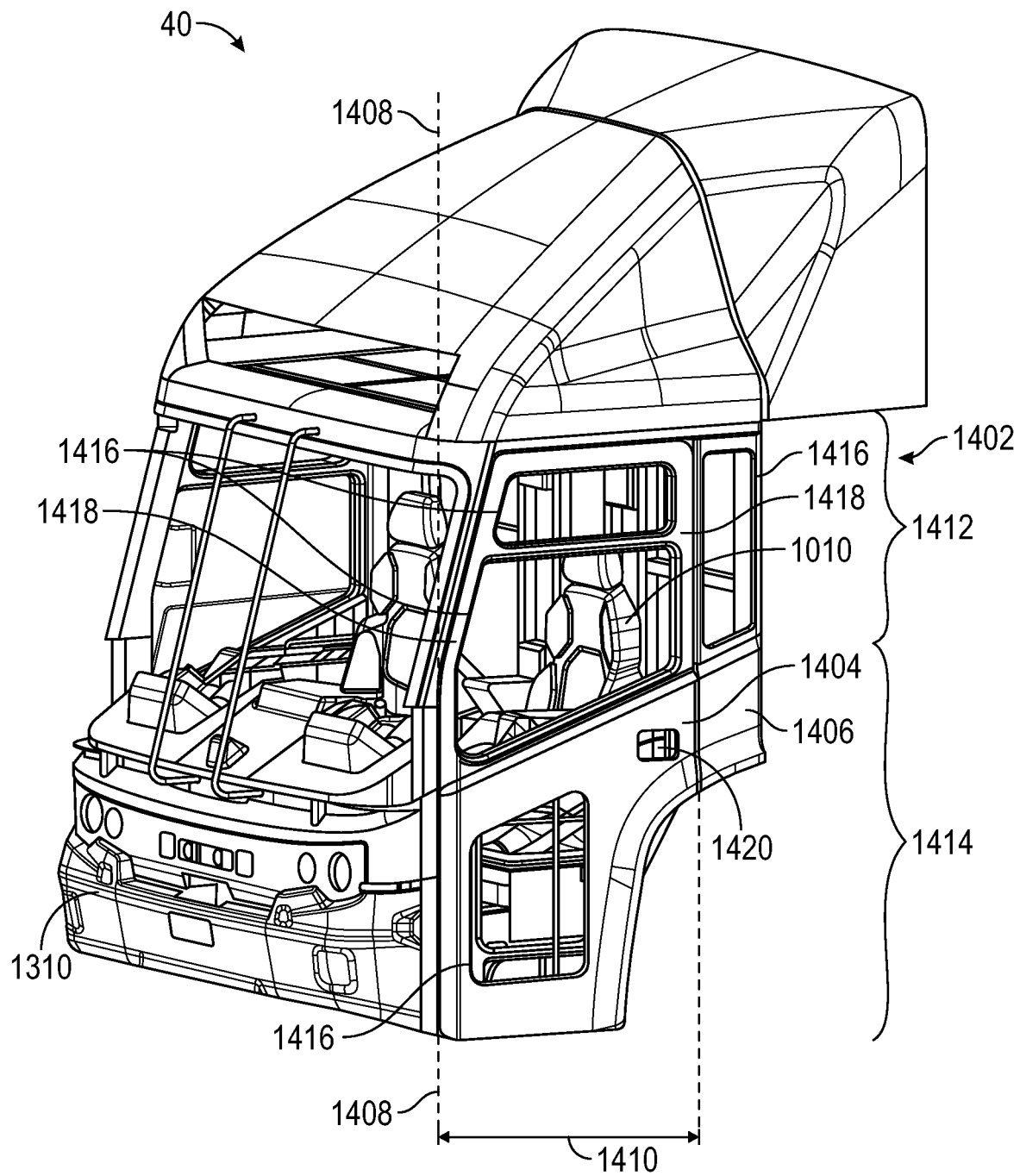
FIG. 15 is a perspective view of the cab of the vehicle of FIG. 1, according to an exemplary embodiment

According to an exemplary embodiment, as shown in FIG. 15, the cab 40 includes at least one side 1402. The side 1402 may include at least one door, shown as door 1404. In one embodiment, the door 1404, or a portion thereof, may be formed via a stamping process. In other embodiments, the door 1404 may be formed by other processes (e.g., molded, pressed, etc.). The door 1404 facilitates selective access to the cab interior 42 from outside of the vehicle 10. In some embodiments, the door 1404 comprises the entire side of the cab 40. In other embodiments, the side 1402 comprises a plurality of sections. According to an exemplary embodiment, the side 1402 includes a first portion (the door 1404) and a second portion, shown as wall 1406. In an exemplary embodiment, the door 1404 comprises a majority of the surface area defined by the side 1402. In other embodiments, the door 1404 comprises no more than half of the surface area of the side 1402.

The door 1404 may be configured to move between an open position and a closed position. In some embodiments, the door 1404 moves by rotating about a vertical axis, shown as axis 1408. The axis 1408 may be coupled with a front edge of the door 1404 or a back edge of the door 1404. In some embodiments, the door 1404 swings inward to open the cab 40. In other embodiments, the door 1404 swings outward to open the cab 40. When rotating about an axis, the door 1404 may use piano hinges that are coupled to an edge of the door 1404. The piano hinges may be forward or backward hinges. In other embodiments, the door 1404 uses other hinges. In other embodiments, the door 1404 moves by rotating about a different axis (e.g., horizontal, 45 degree, etc.). In other embodiments, the door 1404 moves by being removed from the cab 40 and replaced back onto the cab 40. In other embodiments, the door 1404 moves by sliding along a rail or track.

In some embodiments, the wall 1406 is stationary. The wall 1406 may provide a seal with the door 1404 when in the closed position. In other embodiments, the wall 1406 is not stationary. The wall 1406 may be configured to move between an open position and a closed position. In some embodiments, the wall 1406 moves similarly to the door 1404 (e.g., if the door 1404 rotates about an axis, the wall 1406 rotates about an axis). In other embodiments, the wall 1406 moves different than the door 1404 (e.g., if the door 1404 rotates, the wall 1406 slides). In some embodiments, movement of the wall 1406 is independent from the movement of the door 1404. In other embodiments, movement of the wall 1406 is dependent on movement of the door 1404 (e.g., the door 1404 must open before the wall 1406 can open). In other embodiments, movement of the door 1404 is dependent on movement of the wall 1406.

In some embodiments, the door 1404 has a width, shown as door width 1410. The door 1404 may have a plurality of widths. In one embodiment, the door width 1410 refers to the widest part of the door 1404. In some embodiments, the door width 1410 may be less than or equal to 36 inches wide. In some embodiments, the door 1404 is one continuous portion. In other embodiments, the door 1404 has a plurality of portions. According to an exemplary embodiment, the door 1404 has a first portion, shown as top portion 1412, and a second portion, shown as bottom portion 1414. In some embodiments, the top portion 1412 is taller than the bottom portion 1414. In other embodiments, the top portion 1412 is shorter than the bottom portion 1414. In other embodiments, the top portion 1412 has the same height as the bottom portion 1414. In other embodiments, the plurality of portions are arranged differently (e.g., side by side).

According to an exemplary embodiment, the top portion 1412 includes at least one window 1416. The at least one window 1416 may be thinner than other components of the door 1404 (e.g., door frame, armrest, etc.) such that the window 1416 provides more room in the cab interior 42 than the other components of the door 1404 (e.g., more clearance room for the operator next to the window 1416 than next to the door frame).

In some embodiments, a majority of a surface area of the top portion 1412 is comprised of the at least one window 1416. In one embodiment, the whole top portion 1412 comprises at least one window 1416. In such an embodiment, the top portion 1412 may include a perimeter 1418. In some embodiments, the perimeter 1418 is as thin as an inch wide. In other embodiments, the perimeter 1418 is thicker than an inch. In other embodiments, the perimeter 1418 is thinner than an inch. In other embodiments, a majority of the surface area of the top portion 1412 does not comprise a window 1416 (e.g., solid wall). In another embodiment, the top portion 1412 includes a plurality of windows 1416. At least one of the plurality of windows 1416 may be configured to open and close based on operator input. The input may be electronic (e.g., the window 1416 is electrically controlled by a switch) or manual (e.g., the window 1416 is manually controlled by a handle). In other embodiments, none of the plurality of windows 1416 are configured to open and close.

In some embodiments, each of the plurality of windows 1416 may have a perimeter 1418. Each perimeter 1418 may be a different thickness. In other embodiments, each perimeter 1418 is the same thickness. In some embodiments, a window 1416 is positioned rearward on the door 1404 to provide extra clearance (e.g., elbow and shoulder clearance) for the operator. The window 1416 positioned rearward on the door 1404 may also provide better visibility for an operator.

According to an exemplary embodiment, the bottom portion 1414 of the door 1404 includes at least one window 1416. In some embodiments, a majority of a surface area of the bottom portion 1414 is comprised of the at least one window 1416. In one embodiment, the whole bottom portion 1414 is comprised of the at least one window 1416. In such an embodiment, the bottom portion 1414 may include a perimeter 1418. In other embodiments, a majority of the surface area of the bottom portion 1414 does not comprise a window 1416. In other embodiments, the bottom portion 1414 includes no windows 1416.

In some embodiments, the wall 1406 includes at least one window 1416. In some embodiments, a majority of a surface area of the wall 1406 is comprised of the at least one window 1416. In one embodiment, the whole wall 1406 is comprised of the at least one window 1416. In such an embodiment, the wall 1406 may include a perimeter 1418. In other embodiments, a majority of the surface area of the wall 1406 does not comprise a window 1416. In other embodiments, the wall 1406 includes no windows 1416.

In some embodiments, the door 1404 includes an opening mechanism, shown as opening mechanism 1420. The opening mechanism 1420 may be any mechanism configured to keep the door 1404 in a closed position when activated, and release the door 1404 from the closed position when deactivated. Activation and deactivation of the opening mechanism 1420 can apply to either keeping the door 1404 in the closed position or releasing the door 1404 to move into an open position. In one embodiment, the opening mechanism 1420 is a handle. In other embodiments, the opening mechanism can be a lever, a button, a switch, a toggle, a latch, a knob, a handle, etc. In some embodiments, the opening mechanism 1420 is disposed on the top portion 1412 of the door 1404. In another embodiment, the opening mechanism 1420 is disposed on the bottom portion 1414 of the door 1404. In another embodiment, the opening mechanism 1420 is disposed on the wall 1406. The opening mechanism 1420 may be placed anywhere on the side 1402 of the cab 40 such that it controls the movement of the door 1404 between the open position and the closed position.

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 as shown in the various exemplary embodiments is illustrative only. Additionally, any element disclosed in one embodiment may be incorporated or utilized with any other embodiment disclosed herein. For example, the cab 40 of the exemplary embodiment shown in at least FIGS. 10-15 may be incorporated into the refuse vehicle 100 of the exemplary embodiment shown in at least FIG. 3. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A vehicle comprising:
a chassis coupled to a wheel, the chassis including a first portion, a second portion, and a transition portion disposed between the first portion and the second portion, wherein the first portion is disposed at a same elevation as the second portion and the transition portion such that the first portion, the second portion, and the transition portion are coplanar along a length of the chassis;
a cab supported by the first portion of the chassis, the cab including:
a tunnel configured to at least partially receive the first portion of the chassis; and
a seat supported within an interior of the cab and including a seat support and a backrest, wherein an uppermost surface of the tunnel is arranged at a tunnel height that is lower than a support height of the seat support;
and
a body supported by the second portion of the chassis,
wherein the first portion of the chassis includes a frame extension or an inward-offset frame rail configuration and the second portion of the chassis comprises a first frame rail and a second frame rail, and
wherein the first portion of the chassis is narrower in width than the second portion of the chassis and the transition portion is oriented at an angle to couple the first portion with the second portion.

2. The vehicle of claim 1, wherein the tunnel protrudes into the interior of the cab and divides the cab into a first side and a second side.

3. The vehicle of claim 2, wherein the seat is disposed on the first side of the cab, wherein a centerline of the seat is greater than or equal to about 15 inches away from an inner surface of a door of the cab.

4. The vehicle of claim 1, wherein the seat is a first seat and the cab includes a second seat, wherein a distance between a centerline of the first seat and a centerline of the second seat is less than or equal to about 45 inches.

5. The vehicle of claim 1, wherein the cab defines a front width of less than or equal to about 80 inches and a rear width of less than or equal to about 86 inches.

6. The vehicle of claim 1, wherein the cab includes a multi-step entry having a first step and a second step, wherein the first step has a first step height defined by a distance between a ground and the first step and the second step has a second step height defined by a distance between the first step and the second step, the first step height being approximately equal to the second step height.

7. The vehicle of claim 1, wherein the cab includes a single-step entry having a first step arranged approximately fifteen inches above a ground.

8. The vehicle of claim 1, wherein the first portion of the chassis includes the inward-offset frame rail configuration and the transition portion is oriented at the angle relative to a frame rail of the first portion and a frame rail of the second portion.

9. The vehicle of claim 1, wherein the tunnel defines a lateral tunnel width that is greater than a width defined laterally between exteriors of the first frame rail and the second frame rail at the first portion of the chassis.

10. A vehicle, comprising:
a chassis coupled to a wheel, the chassis including a first frame rail and a second frame rail;
a cab supported by a front portion and a transition portion of the chassis, the cab including:
a tunnel protruding into an interior of the cab, wherein the tunnel divides the cab into a first side and a second side;
the tunnel defining a lateral tunnel width that is greater than a width defined laterally between exteriors of the first frame rail and the second frame rail at the front portion of the chassis;
a first seat within the interior of the cab and arranged on the first side of the cab; and a second seat within the interior of the cab and arranged on the second side of the cab;
and
a body supported by a rear portion of the chassis;
wherein the transition portion is oriented at an angle and disposed between the front portion and the rear portion of the chassis, such that the front portion of the chassis is narrower in width than the rear portion of the chassis, and wherein the first portion is disposed at a same elevation as the second portion and the transition portion.

11. The vehicle of claim 10, wherein a centerline of the first seat is greater than or equal to about 15 inches away from an inner surface of a door of the cab.

12. The vehicle of claim 10, wherein a distance between a centerline of the first seat and a centerline of the second seat is less than or equal to about 45 inches.

13. The vehicle of claim 10, the cab defines a front width of less than or equal to about 80 inches and a rear width of less than or equal to about 86 inches.

14. The vehicle of claim 10, wherein the first side of the cab includes a multi-step entry having a first step and a second step, wherein the first step has a first step height defined by a distance between a ground and the first step and the second step has a second step height defined by a distance between the first step and the second step, the first step height being approximately equal to the second step height.

15. The vehicle of claim 14, wherein the second side of the cab includes a single-step entry.

16. A vehicle, comprising:
a chassis coupled to a wheel, the chassis including a front portion, a rear portion, and a transition portion disposed between the front portion and the rear portion such that the front portion of the chassis is narrower in width than the rear portion of the chassis and the transition portion is oriented at an angle to couple the front portion with the rear portion, wherein the front portion, the rear portion, and the transition portion are coplanar along a length of the chassis;
a cab supported by the front portion of the chassis, the cab including:
a tunnel configured to receive at least part of the front portion of the chassis, wherein the tunnel divides the cab into a first side and a second side;
a first seat within an interior of the cab and arranged on the first side of the cab; and
a multi-step entry arranged on the first side of the cab and including a first step and a second step, wherein the first step has a first step height and the second step has a second step height, the first step height being approximately equal to the second step height;
and
a body supported by the rear portion of the chassis.

17. The vehicle of claim 16, wherein a centerline of the first seat is greater than or equal to about 15 inches away from an inner surface of a door of the cab.

18. The vehicle of claim 16, wherein the first seat includes a seat support and a backrest, wherein an uppermost surface of the tunnel is arranged at a tunnel height that is lower than a support height of the seat support.

19. The vehicle of claim 16, wherein the second side of the cab includes a single-step entry.

20. The vehicle of claim 16, wherein the chassis includes a first frame rail and a second frame rail extending from the front portion to the rear portion, and wherein the tunnel defines a lateral tunnel width that is greater than a width defined laterally between exteriors of the first frame rail and the second frame rail at the front portion of the chassis.

* * * * *